US012443119B2

(12) United States Patent
Watariguchi et al.

(10) Patent No.: US 12,443,119 B2
(45) Date of Patent: Oct. 14, 2025

(54) PROCESS CARTRIDGE AND ELECTROPHOTOGRAPHIC APPARATUS

(71) Applicant: CANON KABUSHIKI KAISHA, Tokyo (JP)

(72) Inventors: Kaname Watariguchi, Kanagawa (JP); Chiharu Nakazono, Shizuoka (JP); Hideharu Shimozawa, Tokyo (JP); Tsutomu Nishida, Shizuoka (JP); Atsushi Okuda, Kanagawa (JP); Taiji Katsura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 18/178,070

(22) Filed: Mar. 3, 2023

(65) Prior Publication Data

US 2023/0333494 A1 Oct. 19, 2023

(30) Foreign Application Priority Data

Mar. 14, 2022 (JP) ................................ 2022-039604

(51) Int. Cl.
*G03G 9/087* (2006.01)
*G03G 5/07* (2006.01)
(Continued)

(52) U.S. Cl.
CPC ......... *G03G 5/14734* (2013.01); *G03G 5/072* (2020.05); *G03G 9/09708* (2013.01); *G03G 21/1814* (2013.01)

(58) Field of Classification Search
CPC ........... G03G 5/14704; G03G 5/14708; G03G 5/14734; G03G 5/14786
See application file for complete search history.

(56) References Cited

U.S. PATENT DOCUMENTS 7,645,547 B2 1/2010 Okuda
7,655,370 B2 2/2010 Kitamura
(Continued)

FOREIGN PATENT DOCUMENTS

JP 3-152588 A 6/1991
JP 2002-221820 * 8/2002 .............. G03G 9/08
(Continued)

OTHER PUBLICATIONS

Translation of JP 2002-221820.*
(Continued)

*Primary Examiner* — Peter L Vajda
(74) *Attorney, Agent, or Firm* — VENABLE LLP

(57) ABSTRACT

The process cartridge is a process cartridge to be removably mounted onto a main body of an electrophotographic apparatus, the process cartridge including: an electrophotographic photosensitive member; a toner; and a developing member, wherein the electrophotographic photosensitive member includes a surface layer that is a polymerized film of a composition containing at least one kind of monofunctional (meth)acrylic compound selected from the group consisting of: a monofunctional (meth)acrylic monomer; and a monofunctional (meth)acrylic oligomer, and at least one kind of tri- or higher functional (meth)acrylic compound selected from the group consisting of: a tri- or higher functional (meth)acrylic monomer; and a tri- or higher functional (meth)acrylic oligomer, wherein the toner contains a toner particle and a hydrotalcite particle as an external additive, and wherein the hydrotalcite particle contains fluorine in filter fitting analysis of STEM-EDS analysis.

17 Claims, 2 Drawing Sheets

(51) Int. Cl.

| | |
|---|---|
| ***G03G 5/147*** | (2006.01) |
| ***G03G 9/097*** | (2006.01) |
| ***G03G 21/18*** | (2006.01) |

(56) References Cited

U.S. PATENT DOCUMENTS

| | | | |
|---|---|---|---|
| 8,632,935 | B2 | 1/2014 | Sugiyama |
| 8,669,027 | B2 | 3/2014 | Anezaki |
| 8,753,789 | B2 | 6/2014 | Ogaki |
| 8,765,335 | B2 | 7/2014 | Tanaka |
| 8,815,479 | B2 | 8/2014 | Shida |
| 8,841,052 | B2 | 9/2014 | Watariguchi |
| 8,921,020 | B2 | 12/2014 | Murai |
| 8,974,991 | B2 | 3/2015 | Kawahara |
| 8,980,508 | B2 | 3/2015 | Okuda |
| 8,980,509 | B2 | 3/2015 | Noguchi |
| 9,029,054 | B2 | 5/2015 | Okuda |
| 9,063,505 | B2 | 6/2015 | Sekiya |
| 9,068,083 | B2 | 6/2015 | Tanaka |
| 9,069,267 | B2 | 6/2015 | Kaku |
| 9,114,565 | B2 | 8/2015 | Kawai |
| 9,170,506 | B2 | 10/2015 | Tanaka |
| 9,170,507 | B2 | 10/2015 | Sugiyama |
| 9,188,888 | B2 | 11/2015 | Okuda |
| 9,207,550 | B2 | 12/2015 | Okuda |
| 9,280,071 | B2 | 3/2016 | Maruyama |
| 9,280,072 | B2 | 3/2016 | Ogaki |
| 9,282,615 | B2 | 3/2016 | Yamagishi |
| 9,304,416 | B2 | 4/2016 | Noguchi |
| 9,341,964 | B2 | 5/2016 | Ogaki |
| 9,436,106 | B2 | 9/2016 | Kuno |
| 9,436,107 | B2 | 9/2016 | Murakami |
| 9,459,542 | B2 | 10/2016 | Tanaka |
| 9,459,545 | B2 | 10/2016 | Tanaka |
| 9,500,966 | B2 | 11/2016 | Watariguchi |
| 9,535,347 | B2 | 1/2017 | Watariguchi |
| 9,541,850 | B2 | 1/2017 | Nishida |
| 9,563,139 | B2 | 2/2017 | Kawahara |
| 9,575,422 | B2 | 2/2017 | Okuda |
| 9,599,917 | B2 | 3/2017 | Okuda |
| 9,645,515 | B2 | 5/2017 | Kuno |
| 9,645,516 | B2 | 5/2017 | Kawahara |
| 9,684,277 | B2 | 6/2017 | Yamamoto |
| 9,726,992 | B2 | 8/2017 | Sakuma |
| 9,772,596 | B2 | 9/2017 | Mitsui |
| 9,791,792 | B2 | 10/2017 | Miyauchi |
| 9,869,032 | B2 | 1/2018 | Kawahara |
| 10,416,581 | B2 | 9/2019 | Ito |
| 10,539,892 | B2 | 1/2020 | Nishida |
| 10,558,132 | B2 | 2/2020 | Ishiduka |
| 10,558,133 | B2 | 2/2020 | Nakamura |
| 10,642,177 | B2 | 5/2020 | Nakamura |
| 10,691,033 | B2 | 6/2020 | Nishida |
| 10,747,130 | B2 | 8/2020 | Okuda |
| 10,747,131 | B2 | 8/2020 | Watanabe |
| 10,831,118 | B2 | 11/2020 | Watanabe |
| 10,838,315 | B2 | 11/2020 | Shimozawa |
| 11,003,102 | B2 | 5/2021 | Ishiduka |
| 11,112,719 | B2 | 9/2021 | Makisumi |
| 11,126,097 | B2 | 9/2021 | Ishida |
| 11,137,716 | B2 | 10/2021 | Hiyama |
| 11,181,837 | B2 | 11/2021 | Sekiya |
| 11,237,493 | B2 | 2/2022 | Makisumi |
| 11,249,407 | B2 | 2/2022 | Watariguchi |
| 11,256,186 | B2 | 2/2022 | Shimozawa |
| 11,340,553 | B2 | 5/2022 | Watariguchi |
| 11,366,402 | B2 | 6/2022 | Ishiduka |
| 11,392,050 | B2 | 7/2022 | Nishida |
| 2003/0190546 | A1 | 10/2003 | Yoshino |
| 2004/0253527 | A1* | 12/2004 | Suzuki ................. G03G 5/0592 430/58.7 |
| 2007/0212625 | A1 | 9/2007 | Suzuki |
| 2007/0212627 | A1 | 9/2007 | Yanagawa |
| 2010/0197200 | A1* | 8/2010 | Ujihara .................. G03G 5/144 451/28 |
| 2020/0285165 | A1 | 9/2020 | Chiba |
| 2023/0055856 | A1 | 2/2023 | Sekiya |
| 2023/0058278 | A1 | 2/2023 | Murayama |
| 2023/0059041 | A1 | 2/2023 | Kaku |
| 2023/0059696 | A1 | 2/2023 | Watariguchi |
| 2023/0059773 | A1 | 2/2023 | Yamaai |
| 2023/0075407 | A1 | 3/2023 | Makisumi |
| 2023/0101167 | A1 | 3/2023 | Shimozawa |

FOREIGN PATENT DOCUMENTS

| | | | |
|---|---|---|---|
| JP | 2003-66637 | A | 3/2003 |
| JP | 2005-266277 | A | 9/2005 |
| JP | 2006-250989 | A | 9/2006 |
| JP | 2008-129481 | A | 6/2008 |
| JP | 2011-158790 | A | 8/2011 |
| JP | 2012-27091 | A | 2/2012 |
| JP | 2016-156977 | A | 9/2016 |

OTHER PUBLICATIONS

U.S. Appl. No. 18/168,736, filed Feb. 14, 2023, Shuhei Iwasaki.
U.S. Appl. No. 18/174,978, filed Feb. 27, 2023, Hideharu Shimozawa.
U.S. Appl. No. 18/178,731, filed Mar. 6, 2023, Chiharu Nakazono.
Takayuki Otsu, On the Functions of Polymerization Inhibitors, J. Synth. Org. Chem. Japan, vol. 33, No. 8 (1975) 634-40.

* cited by examiner

PROCESS CARTRIDGE AND ELECTROPHOTOGRAPHIC APPARATUS

BACKGROUND OF THE INVENTION

Field of the Invention

The present invention relates to a process cartridge and an electrophotographic apparatus each including an electrophotographic photosensitive member.

Description of the Related Art

In a recent electrophotographic apparatus, downsizing and cost reduction have been demanded along with extension of life and an increase in speed. However, in an electrophotographic process, the extension of life and the increase in speed are liable to cause various adverse effects. When a member and a control unit are added so as to counteract those adverse effects, the electrophotographic apparatus is increased in size, and the cost thereof is also liable to be increased. Accordingly, in order to achieve both the extension of life and the increase in speed, and the downsizing and the cost reduction, various attempts have been made to deal with various adverse effects.

As one of the above-mentioned adverse effects, there is a problem in that power required for driving an electrophotographic photosensitive member (hereinafter sometimes referred to as "photosensitive member") mounted on the electrophotographic apparatus is increased due to repeated use. When an increase in power is large, a driving device with a correspondingly large output is required from the start, and hence the electrophotographic apparatus is increased in size and cost. The driving power is proportional to the driving torque of the photosensitive member, and hence the recent photosensitive member has been required to suppress an increase in driving torque at the time of repeated use.

In Japanese Patent Application Laid-Open No. 2016-156977, there is a description of an image forming method involving increasing the supply amount of an inorganic lubricant to the surface of a photosensitive member along with an increase in number of charging histories of the photosensitive member caused by repeated use. When a protective layer made of a crosslinking-type curable resin is formed on the surface of the photosensitive member to impart high durability in order to cope with long life, the degree of a deterioration speed of the surface of the photosensitive member by charging becomes larger than the degree of a surface wear speed, and the driving torque is increased due to an adhering discharge product. In order to suppress the increase in driving torque, a lubricant is supplied to the surface of the photosensitive member to form a coating of the lubricant, thereby being capable of reducing the driving torque.

In Japanese Patent Application Laid-Open No. 2006-250989, there is a description of an image forming apparatus including a photosensitive member in which a protective layer obtained by curing a monofunctional (meth)acrylic polymerizable compound having a charge-transportable structure and a tri- or higher functional (meth)acrylic monomer having no charge-transportable structure is formed on a surface, and a heater installed inside the photosensitive member. When the monofunctional monomer and the tri- or higher functional monomer are cured, a three-dimensional network structure is developed to increase a crosslinking density, to thereby provide a protective layer having high hardness, high elasticity, and high smoothness. In addition, when the humidity of the surface of the photosensitive member is decreased through use of the heater, an increase in moisture adsorption amount on the surface caused by a small amount of wear of the protective layer can be suppressed, and a problem of image deletion (sometimes referred to as "image blurring") can be addressed.

In Japanese Patent Application Laid-Open No. 2011-158790, there is a description of an image forming apparatus including a photosensitive member in which a surface protective layer contains fluorine, a detecting unit that detects the frictional resistance of the surface of the photosensitive member, and a polishing unit and a control unit that change conditions for polishing the surface of the photosensitive member in accordance with the detection results. When fluorine is incorporated into the protective layer, the hydrophobicity of the surface of the photosensitive member is enhanced, and image deletion can be suppressed without arrangement of a heater. Further, even when the adhesion of a discharge product to the surface of the photosensitive member and the oxidation deterioration of the photosensitive member progress due to repeated use, resulting in the adsorption of moisture to such an extent that fluorine alone cannot suppress the adsorption, or when fluorine is not uniformly contained in a thickness direction of the protective layer, the image deletion can be reliably suppressed by the detecting unit, the polishing unit, and the control unit. In addition, in order to detect the frictional resistance, the driving torque of the photosensitive member may be measured by measuring the current value of a driving motor.

In Japanese Patent Application Laid-Open No. 2003-66637, there is a description of an image forming method involving supplying a developer containing a hydrotalcite compound to the surface of a photosensitive member. When the hydrotalcite compound having anion exchangeability in the developer exhibits an acid-accepting effect, a discharge product can be effectively removed without new incorporation of a complicated device to suppress the adsorption of moisture in the atmosphere. In addition, there is a disclosure that a certain degree of wear of a surface layer can suppress the renewal of a deteriorated surface and the progress of the adhesion of the discharge product to the surface.

In Japanese Patent Application Laid-Open No. 2012-27091, there is a description of an image forming apparatus including a photosensitive member including a protective layer obtained by curing a (meth)acrylic polymerizable compound having one functional group and a (meth)acrylic polymerizable compound having three or more functional groups, and a developing unit including a two-dimensional layer structure such as a hydrotalcite compound serving as an inorganic lubricant together with a toner. In addition, the protective layer may contain fluororesin powder or a metal fluoride as a filler. Because of the above-mentioned combination, effects, such as the improvement of wear resistance, scratch resistance, and a cleaning property, the suppression of image deletion, and the suppression of filming, are stably achieved even at the time of repeated use.

In Japanese Patent Application Laid-Open No. 2008-129481, there is a description of a semiconductive member for forming an image containing hydrotalcite, a fluorine-based polymer nanoparticle, and an acrylic resin. When the semiconductive member is used as at least any one of a charging unit or a transfer unit, the adhesion of paper powder and a toner to the surface of the semiconductive member can be suppressed. In addition, when bleeding from the semiconductive member is suppressed, the contamination of a photosensitive member can be prevented, and the suppression of environmental changes and the elimination of deterioration of image quality can be achieved without impairment of conductivity. Further, slipperiness can be improved, and wear resistance and durability can be improved.

In Japanese Patent Application Laid-Open No. H03-152588, there is a description of an electrophotographic apparatus in which a coating formed of graphite fluoride and a hydrotalcite compound is present at least in a distal end edge portion of a rubber-like elastic body cleaning blade. Even when the apparatus is installed under a high-temperature environment for a long period of time, the hydrotalcite adsorbs a fluorine anion generated from the graphite fluoride by ion exchange, and thus frictional resistance between the cleaning blade and a photosensitive member can be decreased to improve a cleaning property without any adverse effects on an image.

SUMMARY OF THE INVENTION

According to investigations made by the inventors, in any of the technologies described in Japanese Patent Application Laid-Open No. 2016-156977, Japanese Patent Application Laid-Open No. 2006-250989, Japanese Patent Application Laid-Open No. 2011-158790, Japanese Patent Application Laid-Open No. 2003-66637, Japanese Patent Application Laid-Open No. 2012-27091, Japanese Patent Application Laid-Open No. 2008-129481, and Japanese Patent Application Laid-Open No. H03-152588, the kind of substance for reducing the driving torque, which is present on the photosensitive member, and the change in amount of the substance for reducing the driving torque at the time of repeated use were not optimized. For this reason, there has been an object of suppressing an increase in driving torque at the time of long-life and high-speed repeated use without increasing the size and cost of an electrophotographic apparatus by adding a member and a control unit and without depending on various temperature and humidity environments from low temperature and low humidity to high temperature and high humidity and various potential settings in a charging portion, a transfer portion, and the like.

Accordingly, it is an object of the present invention to provide a process cartridge, which suppresses an increase in driving torque at the time of long-life and high-speed repeated use without increasing the size and cost of an electrophotographic apparatus by adding a member and a control unit and without depending on various temperature and humidity environments from low temperature and low humidity to high temperature and high humidity and various potential settings in a charging portion, a transfer portion, and the like.

The above-mentioned object is achieved by the present invention described below. That is, a process cartridge according to the present invention is a process cartridge to be removably mounted onto a main body of an electrophotographic apparatus, the process cartridge including: an electrophotographic photosensitive member; a toner; and a developing member configured to supply the toner to the electrophotographic photosensitive member, wherein the electrophotographic photosensitive member includes a surface layer that is a polymerized film of a composition containing at least one kind of monofunctional (meth)acrylic compound selected from the group consisting of: a monofunctional (meth)acrylic monomer; and a monofunctional (meth)acrylic oligomer, and at least one kind of tri- or higher functional (meth)acrylic compound selected from the group consisting of: a tri- or higher functional (meth)acrylic monomer; and a tri- or higher functional (meth)acrylic oligomer, wherein the toner contains a toner particle and a hydrotalcite particle as an external additive, and wherein the hydrotalcite particle contains fluorine in filter fitting analysis of STEM-EDS analysis.

According to the present invention, the process cartridge, which suppresses an increase in driving torque at the time of long-life and high-speed repeated use without increasing the size and cost of an electrophotographic apparatus by adding a member and a control unit and without depending on various temperature and humidity environments from low temperature and low humidity to high temperature and high humidity and various potential settings in a charging portion, a transfer portion, and the like, can be provided.

Further features of the present invention will become apparent from the following description of exemplary embodiments with reference to the attached drawings.

DESCRIPTION OF THE EMBODIMENTS

Figure 1:
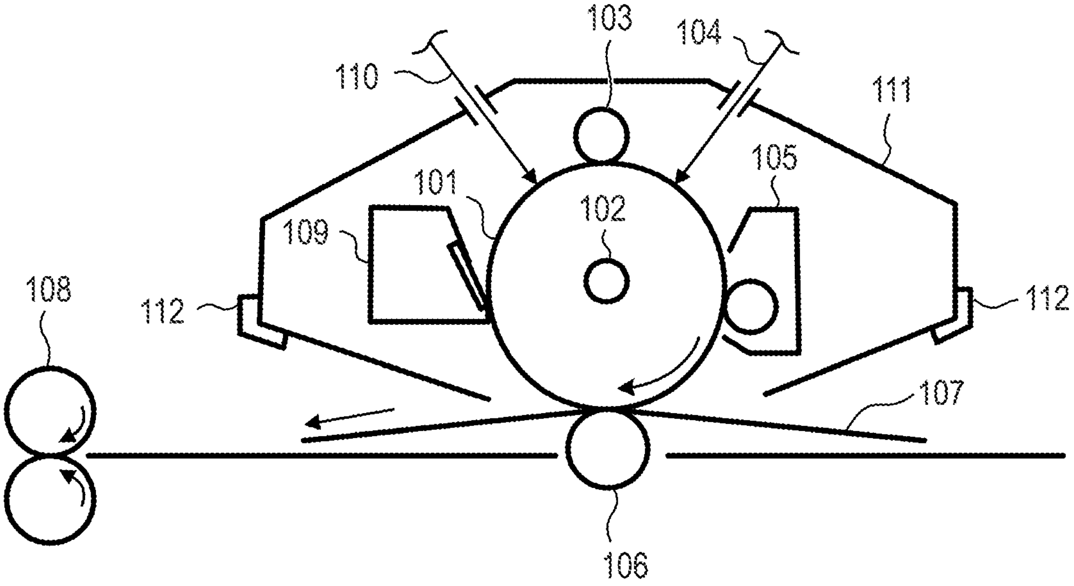
FIG. 1 is a schematic view for illustrating an example of an electrophotographic s including a process cartridge including an electrophotographic photosensitive member, a toner, and a developing member.

The present invention is described in detail below by way of exemplary embodiments.

The present invention relates to a process cartridge to be removably mounted onto a main body of an electrophotographic apparatus, the process cartridge including: an electrophotographic photosensitive member; a toner; and a developing member configured to supply the toner to the electrophotographic photosensitive member, wherein the electrophotographic photosensitive member includes a surface layer that is a polymerized film of a composition containing at least one kind of monofunctional (meth)acrylic compound selected from the group consisting of: monofunctional (meth)acrylic monomer; and a monofunctional (meth) acrylic oligomer, and at least one kind of tri- or higher functional (meth)acrylic compound selected from the group consisting of: a tri- or higher functional (meth)acrylic monomer; and a tri- or higher functional (meth)acrylic oligomer, wherein the toner contains a toner particle and a hydrotalcite particle as an external additive, and wherein the hydrotalcite particle contains fluorine in filter fitting analysis of STEM-EDS analysis.

The present invention also relates to an electrophotographic apparatus including the above-mentioned process cartridge.

According to the investigations made by the inventors, the addition of a member and a control unit in the related art caused increases in size and cost of the electrophotographic apparatus. In addition, in the driving torque-reducing substance in the related art, the kind and change in amount at the time of repeated use thereof were not optimized, and hence the effect of suppressing an increase in driving torque at the time of long-life and high-speed repeated use without depending on various temperature and humidity environments from low temperature and low humidity to high temperature and high humidity and various potential settings in a charging portion, a transfer portion, and the like was insufficient.

In view of the foregoing, the inventors have optimized the combination of the photosensitive member and the toner, and have found that it is appropriate to design and combine the photosensitive member and the toner as described below in order to solve the above-mentioned problems.

<Design of Photosensitive Member>

It is required that the electrophotographic photosensitive member according to the present invention include a surface layer formed by polymerizing a composition containing at least one kind of monofunctional (meth)acrylic compound selected from the group consisting of: a monofunctional (meth)acrylic monomer; and a monofunctional (meth) acrylic oligomer, and at least one kind of tri- or higher functional (meth)acrylic compound selected from the group consisting of: a tri- or higher functional (meth)acrylic monomer; and a tri- or higher functional (meth)acrylic oligomer.

(Advantage of Tri- or Higher Functional (Meth)acrylic Compound)

On one hand, when the electrophotographic photosensitive member according to the present invention contains a tri- or higher functional (meth)acrylic compound, a three-dimensional network structure is developed, and wear resistance suitable for high speed and long life is obtained.

(Advantage 1 of Monofunctional (Meth)acrylic Compound)

On the other hand, when the electrophotographic photosensitive member according to the present invention contains a monofunctional (meth)acrylic compound, the monofunctional (meth)acrylic compound freely moves in the composition in a polymerization process and efficiently reacts with unreacted acryloyloxy groups of another (meth) acrylic compound, to thereby reduce the number of unreacted acryloyloxy groups in the entire composition. As a result, the polymerization rate of the composition is increased to contribute to the improvement of wear resistance as well as the development of the three-dimensional network structure. In contrast, in the case of a bi- or higher functional (meth)acrylic compound, when one acryloyloxy group reacts, the (meth)acrylic compound is fixed at a crosslinking point thereof and cannot freely move in the composition. As a result, the probability that the unreacted acryloyloxy groups of the (meth)acrylic compound react with unreacted acryloyloxy groups of another (meth)acrylic compound is decreased, and the number of unreacted acryloyloxy groups in the entire composition is increased.

As described above, the surface layer obtained by polymerizing the composition containing the tri- or higher functional (meth)acrylic compound and the monofunctional (meth)acrylic compound is excellent in wear resistance, and physical strength enough to withstand high-speed and long-life use is obtained. However, when the photosensitive member is repeatedly used, an increase in driving torque caused by discharge deterioration of the surface layer becomes another problem.

(Advantage 2 of Monofunctional (Meth)acrylic Compound)

The inventors presume that the increase in driving torque caused by repeated use occurs for the following two reasons. That is, the unreacted acryloyloxy groups exposed on the surface of the photosensitive member are decomposed by discharge to generate sites each having large polarity on the surface, and hence the surface layer adsorbs moisture in the atmosphere to increase the adhesive property between the photosensitive member and any other member with which the photosensitive member is brought into contact in an electrophotographic process, resulting in an increase in driving torque (Reason 1). As described in Japanese Patent Application Laid-Open No. 2005-266277, a discharge product that adheres to and accumulates on the surface layer of the photosensitive member due to the repetition of discharge adsorbs moisture in the atmosphere to increase the adhesive property between the photosensitive member and any other member with which the photosensitive member is brought into contact in the electrophotographic process, resulting in an increase in driving torque (Reason 2).

When the monofunctional (meth)acrylic compound is used, the number of unreacted acryloyloxy groups in the entire composition can be reduced as described above, and the unreacted acryloyloxy groups exposed on the surface are no exception. Thus, when the monofunctional (meth)acrylic compound is used, the increase in driving torque based on (Reason 1) is suppressed.

(Advantage 3 of Monofunctional (Meth)acrylic Compound)

When the monofunctional (meth)acrylic compound is used, the crosslinking density of an acrylic resin after polymerization is decreased, and hence the amount of scraping of the surface layer by rubbing against the photosensitive member in the electrophotographic process is increased. As a result, a discharge product adhering to the surface layer is removed from the surface layer by being scraped off in an extremely small amount. Because of this effect, the increase in driving torque based on (Reason 2) described above is suppressed.

(Advantage 4 of Monofunctional (Meth)acrylic Compound)

As described above, the surface layer of the acrylic resin obtained by polymerizing the composition containing the monofunctional (meth)acrylic compound is scraped off by rubbing. As a result, scraped powder containing an ester bond generated by the polymerization reaction is gradually generated due to repeated use. The scraped powder functions as a lubricant in the electrophotographic process, and the amount of the scraped powder is increased, in particular, in the latter half of endurance. As a result, an increase in driving torque caused by the acceleration of moisture adsorption of the surface layer by discharge deterioration and adhesion of a discharge product is suppressed.

As described above, the surface layer obtained by polymerizing the composition containing the monofunctional (meth)acrylic compound and the tri- or higher functional (meth)acrylic compound is excellent in wear resistance in high speed and long life and suppresses an increase in driving torque caused by repeated use. However, <Design of Photosensitive Member> described above alone was insufficient for stably suppressing an increase in driving torque caused by repeated use without depending on various temperature and humidity environments from low temperature and low humidity to high temperature and high humidity and various potential settings in a charging portion, a transfer portion, and the like in the recent increase in speed and extension of life.

<Design of Toner>

It is required that the toner according to the present invention contain, as an external additive, a hydrotalcite particle containing fluorine.

(Advantage 1 of Hydrotalcite Particle)

The hydrotalcite particle, which is a layered compound having strong positive chargeability, incorporates a discharge product of an anion such as NOx into a space between layers by ion exchange. For this reason, the hydrotalcite particle supplied from a developing member to the surface of a photosensitive member at any time in repeated use takes in the discharge product at any time and carries the discharge product away from the surface of the photosensitive member. As a result, the increase in driving torque based on (Reason 2) described above is suppressed.

(Advantage 2 of Hydrotalcite Particle)

The hydrotalcite particle, which is a layered compound, itself functions as a lubricant to suppress an increase in driving torque because sliding occurs between layers when the hydrotalcite particle is sandwiched between the photosensitive member and any other member with which the photosensitive member is brought into contact in the electrophotographic process and receives a pressure.

(Advantage 1 of Hydrotalcite Particle Containing Fluorine)

When the hydrotalcite particle contains fluorine, high hydrophobicity exhibited by fluorine suppresses the adsorption of moisture by the hydrotalcite particle from the atmosphere at the time of repeated use. In addition, when the contained fluorine is transferred to the surface of the photosensitive member, the moisture adsorption on the surface of the photosensitive member is also suppressed. Because of this effect, the surface layer on which the hydrotalcite particle containing fluorine is present can suppress an increase in driving torque caused by the adhesion of moisture.

(Advantage 2 of Hydrotalcite Particle Containing Fluorine)

Fluorine, which has high lubricity, itself functions as a lubricant to suppress an increase in driving torque.

As described above, the external additive containing the hydrotalcite particle containing fluorine suppresses an increase in driving torque caused by repeated use. However, <Design of Toner> described above alone is insufficient for stably suppressing an increase in driving torque caused by repeated use without depending on various temperature and humidity environments from low temperature and low humidity to high temperature and high humidity and various potential settings in a charging portion, a transfer portion, and the like in the recent increase in speed and extension of life.

<Design of Process Cartridge including Combination of Photosensitive Member and Toner>

The inventors have optimized the combination of the photosensitive member and the toner and combined the photosensitive member having the surface layer obtained by polymerizing the composition containing the monofunctional (meth)acrylic compound and the tri- or higher functional (meth)acrylic compound, and the toner containing, as the external additive, the hydrotalcite particle containing fluorine. The inventors have found that, when the photosensitive member and the toner are combined, the synergistic effect described below is obtained in addition to the additive effect of the suppressing effects on the increase in driving torque in <Design of Photosensitive Member> and <Design of Toner> described above.

The term "fluorine" serving as a lubricant in the following description of actions and effects assumes a fluorine-rich fine particle generated by the shredding of a hydrotalcite particle containing fluorine or a fluorine-containing treatment agent contained in hydrotalcite containing fluorine.

(Advantage of Presence of Three Lubricants: Scraped Powder of Surface Layer; Hydrotalcite Particle; and Fluorine)

In the process cartridge of the present invention, in the latter half of endurance in which the driving torque of the photosensitive member is increased due to the moisture adsorption caused by discharge deterioration and an increase in adhesion of a discharge product, scraped powder having no polarity formed by scraping of the surface layer of the photosensitive member, a hydrotalcite particle having strong positive chargeability, and fluorine having strong negative chargeability appear on the surface layer of the photosensitive member. Because of the presence of the lubricants having three different chargeabilities, an increase in driving torque caused by repeated use can be stably suppressed without depending on various temperature and humidity environments from low temperature and low humidity to high temperature and high humidity and various potential settings in a charging portion, a transfer portion, and the like. The inventors presume the reason for the foregoing to be as described below.

In the electrophotographic process, it is required to electrostatically transfer a charged toner to the photosensitive member temporarily at the time of development, and conversely to electrostatically separate the charged toner from the photosensitive member at the time of transfer, and hence a plurality of kinds of electric fields having intensities of different magnitudes and different orientations are inevitably applied to the photosensitive member.

For example, when a negatively charged toner is subjected to reversal development, a large negative charging voltage, a negative developing voltage smaller than the charging voltage, and a positive transfer voltage having opposite polarity are applied to the photosensitive member. As another example, when a positively charged toner is subjected to normal development, a negative charging voltage, a positive developing voltage, and a negative transfer voltage larger than the charging voltage are applied to the photosensitive member.

As described above, when repeated use is continued in an electrophotographic process in which a plurality of kinds of electric fields having intensities of different magnitudes and different orientations are applied, an increase in driving torque can be stably suppressed only when the lubricants having three different chargeabilities: no polarity; positive chargeability; and negative chargeability are present. For example, in a process in which a positive electric field is applied from the outside of the photosensitive member to the photosensitive member, there are a hydrotalcite particle having positive chargeability on a side far from the photosensitive member, fluorine having negative chargeability on a side close to the photosensitive member, and scraped powder having no polarity in the vicinity of the middle thereof. As a result, any one of the three kinds of lubricants fills a region between the photosensitive member and any other member with which the photosensitive member is brought into contact in every hole and corner, with the result that stable suppression of driving torque is achieved. In a process in which a negative electric field is applied from the outside of the photosensitive member to the photosensitive member, the distribution state of the three kinds of lubricants is reversed. In contrast, when the lubricants having three different chargeabilities are not present, the lubricant is localized by the applied electric field in the electrophotographic process, and stable suppression of driving torque is not achieved.

In addition, in a mixed state of the lubricants having three different chargeabilities, the scraped powder having no polarity weakens the electrical bond between the hydrotalcite particle having positive chargeability and the fluorine having negative chargeability to uniform the lubricants. When the presence of the scraped powder having no polarity brings the three kinds of lubricants into a uniformly loosened state as described above, the three kinds of lubricants are easily rearranged in an optimum state in response to changes in various temperature and humidity environments from low temperature and low humidity to high temperature and high humidity and changes in print percentage and image density of a printed image.

(Behavior of Three Kinds of Lubricants with Respect to Print Percentage and Image Density of Printed Image at Time of Repeated Use)

As described above, in order to achieve stable suppression of driving torque at the time of repeated use, the abundances and distribution of the three kinds of lubricants need to be always in a proper balance. In this respect, the three kinds of lubricants of the present invention are automatically optimized for the print percentage and image density of a printed image at the time of repeated use without use of any special supply mechanism or detecting unit. The inventors presume the reason for the foregoing to be as described below.

On one hand, in order for the toner containing the hydrotalcite particle according to the present invention as an external additive to be supplied onto the photosensitive member, the photosensitive member is required to be exposed to light. On the other hand, when the photosensitive member is exposed to light, the amounts of charge and discharge at that portion in a next process are increased, and as a result, the amount of scraping of the surface layer of the present invention is increased, resulting in an increase in amount of scraped powder containing an ester bond. Accordingly, the fluorine having negative chargeability, the hydrotalcite particle having positive chargeability, and the scraped powder having no polarity appear on the photosensitive member in conjunction with an exposure amount that is increased or decreased in accordance with the print percentage or the image density. For this reason, the supply balance of the three kinds of lubricants is automatically optimized.

In addition, when repeated use is performed under a situation in which the print percentage and the image density are low and the exposure amount is small, the generation of scraped powder is suppressed in conjunction with a decrease in transfer of the fluorine and the hydrotalcite particle to the photosensitive member. As a result, only any one or two of the three kinds of lubricants are not increased excessively, and the abundances of the three kinds of lubricants are averaged. In addition, when the exposure amount is small and the amounts of charge and discharge are small, the discharge deterioration and the generation of a discharge product itself are decreased, and hence the required amounts of the three kinds of lubricants are also decreased in terms of absolute values. Accordingly, the total amount of the three kinds of lubricants is linked to the discharge deterioration and the generation of a discharge product, and the total amount of the three kinds of lubricants is not increased excessively. Thus, there is less concern about filming because no wasteful supply is performed, and the cost is suppressed.

The process cartridge of the present invention solves the above-mentioned problems by <Design of Photosensitive Member> and <Design of Toner>, and <Design of Process Cartridge including Combination of Photosensitive Member and Toner> above. That is, first, the surface layer obtained by polymerizing the composition containing the monofunctional (meth)acrylic compound and the tri- or higher functional (meth)acrylic compound, and the toner containing, as the external additive, the hydrotalcite particle containing fluorine each additively exhibit a suppressing effect on driving torque. In addition to the foregoing, second, the fluorine having negative chargeability, the hydrotalcite particle having positive chargeability, and the scraped powder having no polarity and containing an ester bond synergistically exhibit a stable suppressing effect on driving torque. In particular, such an effect that the lubricants having three kinds of polarities are rearranged in an optimum presence state in accordance with various changes and such an effect that the proportions of abundances of the three kinds of lubricants and the absolute value of the total amount thereof are automatically optimized through repeated use owing to a supply unit that supplies the lubricants having three kinds of polarities to the photosensitive member are brought about by the combination of the surface layer of the photosensitive member and the external additive of the toner of the present invention.

As described in the above-mentioned mechanism, the effect of the present invention can be achieved by the synergistic effect exhibited by the respective configurations.

[Electrophotographic Photosensitive Member]

The electrophotographic photosensitive member according to the present invention has a feature of including a surface layer.

A method of producing the electrophotographic photosensitive member according to the present invention is, for example, a method involving: preparing coating liquids for the respective layers to be described later; applying the liquids in a desired layer order; and drying the liquids. At this time, a method of applying each of the coating liquids is, for example, dip coating, spray coating, inkjet coating, roll coating, die coating, blade coating, curtain coating, wire bar coating, or ring coating. Of those, dip coating is preferred from the viewpoints of efficiency and productivity.

The respective layers are described below.

<Support>

In the present invention, the electrophotographic photosensitive member includes a support. In the present invention, the support is preferably a conductive support having conductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, aluminum is preferred. That is, a preferred example of the support is a support using aluminum.

In addition, conductivity may be imparted to the resin or the glass through treatment involving, for example, mixing or coating the resin or the glass with a conductive material.

<Conductive Layer>

In the electrophotographic photosensitive member according to present invention, a conductive layer may be arranged on the support. The arrangement of the conductive layer can conceal flaws and irregularities in the surface of the support, and control the reflection of light on the surface of the support.

The conductive layer preferably contains a conductive particle and a resin.

A material for the conductive particle is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the conductive particle, and in particular, titanium oxide, tin oxide, and zinc oxide are more preferably used.

When the metal oxide is used as the conductive particle, the surface of the metal oxide may be treated with a silane coupling agent or the like, or the metal oxide may be doped with an element, such as phosphorus or aluminum, or an oxide thereof. As the element and the oxide thereof for doping, there are given, for example, phosphorus, aluminum, niobium, and tantalum.

In addition, the conductive particle may be of a laminated construction having a core particle and a coating layer coating the particle. Examples of the core particle include titanium oxide, barium sulfate, and zinc oxide. The coating layer is, for example, a metal oxide, such as tin oxide or titanium oxide.

In addition, when the metal oxide is used as the conductive particle, its volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further contain a concealing agent, such as a silicone oil, a resin particle, or titanium oxide.

The average thickness of the conductive layer is preferably 1 μm or more and 50 μm or less, particularly preferably 3 μm or more and 40 μm or less.

The conductive layer may be formed by: preparing a coating liquid for a conductive layer containing the above-mentioned respective materials and a solvent; forming a coating film of the liquid; and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the conductive particle in the coating liquid for a conductive layer, there are given methods involving using a paint shaker, a sand mill, a ball mill, and a liquid collision-type high-speed disperser.

<Undercoat Layer>

In the electrophotographic photosensitive member according to the present invention, an undercoat layer may be arranged on the support or the conductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, a conductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form an undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The average thickness of the undercoat layer is preferably 0.1 μm or more and 50 μm or less, more preferably 0.2 μm or more and 40 μm or less, particularly preferably 0.3 μm or more and 30 μm or less.

The undercoat layer may be formed by: preparing a coating liquid for an undercoat layer containing the above-mentioned respective materials and a solvent; forming a coating film of the liquid; and drying and/or curing the coating film. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member according to the present invention is mainly classified into (1) a laminate-type photosensitive layer and (2) a monolayer-type photosensitive layer. (1) The laminate-type photosensitive layer has a charge-generating layer containing a charge-generating substance and a charge-transporting layer containing a charge-transporting substance. (2) The monolayer-type photosensitive layer has a photosensitive layer containing both a charge-generating substance and a charge-transporting substance.

(1) Laminate-Type Photosensitive Layer

The laminate-type photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The average thickness of the charge-generating layer is preferably 0.1 μm or more and 1 μm or less, more preferably 0.15 μm or more and 0.4 μm or less.

The charge-generating layer may be formed by: preparing a coating liquid for a charge-generating layer containing the above-mentioned respective materials and a solvent; forming a coating film of the liquid; and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin, a polyester resin, and an acrylic resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, a silica particle, an alumina particle, and a boron nitride particle.

The average thickness of the charge-transporting layer is preferably 5 μm or more and 50 μm or less, more preferably 8 μm or more and 40 μm or less, particularly preferably 10 μm or more and 30 μm or less.

The charge-transporting layer may be formed by: preparing a coating liquid for a charge-transporting layer containing the above-mentioned respective materials and a solvent; forming a coating film of the liquid; and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Monolayer-Type Photosensitive Layer

The monolayer-type photosensitive layer may be formed by: preparing a coating liquid for a photosensitive layer containing the charge-generating substance, the charge-transporting substance, a resin, and a solvent; forming a coating film of the liquid; and drying the coating film. Examples of the charge-generating substance, the charge-transporting substance, and the resin are the same as those of the materials in the section "(1) Laminate-type Photosensitive Layer."

<Protective Layer>

In the electrophotographic photosensitive member according to the present invention, a protective layer may be arranged on the photosensitive layer. The arrangement of the protective layer can improve durability.

It is appropriate that the protective layer be, for example, a resin-containing layer having high strength from the viewpoint that the layer is arranged for the purpose of imparting durability in response to long life. It is not necessarily required to enhance the charge-transporting performance by incorporating a conductive particle or a charge-transporting substance into the layer. However, from the viewpoint of enhancing the basic electrical characteristics of the electrophotographic photosensitive member, it is preferred to achieve both the durability and the basic electrical characteristics by incorporating the conductive particle and/or the charge-transporting substance, and a resin.

Examples of the conductive particle include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The protective layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, a silica particle, an alumina particle, and a boron nitride particle.

The average thickness of the protective layer is preferably 0.5 μm or more and 10 μm or less, more preferably 1 μm or more and 7 μm or less.

The protective layer may be formed by: preparing a coating liquid for a protective layer containing the above-mentioned respective materials and a solvent; forming a coating film of the liquid; and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

<Surface Layer>

In the electrophotographic photosensitive member according to the present invention, the surface layer is required to be a polymerized film of a composition containing at least one kind of monofunctional (meth)acrylic compound selected from the group consisting of: a monofunctional (meth)acrylic monomer; and a monofunctional (meth) acrylic oligomer, and at least one kind of tri- or higher functional (meth)acrylic compound selected from the group consisting of: a tri- or higher functional (meth)acrylic monomer; and a tri- or higher functional (meth)acrylic oligomer.

The surface layer as used herein is a portion in which the electrophotographic photosensitive member is brought into contact with a toner or various members in the electrophotographic process. The protective layer, the charge-transporting layer, the monolayer-type photosensitive layer, and the charge-generating layer may serve as the surface layer, but from the viewpoint of achieving both the durability and the basic electrical characteristics in the electrophotographic process, the surface layer is preferably the protective layer or the charge-transporting layer, more preferably the protective layer.

When the content ratio of the monofunctional (meth) acrylic compound to the tri- or higher functional (meth) acrylic compound is represented by "a" [mass %], the "a" [mass %] is preferably from 20 mass % to 500 mass %. On one hand, when the "a" [mass %] is less than 20 mass %, the advantages described in (Advantage 1 of Monofunctional (Meth)acrylic Compound), (Advantage 2 of Monofunctional (Meth)acrylic Compound), (Advantage 3 of Monofunctional (Meth)acrylic Compound), and (Advantage 4 of Monofunctional (Meth)acrylic Compound) above are weakened. In addition, the effects described in (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) above are weakened. In particular, the supply of scraped powder having no polarity and containing an ester bond is reduced, and the balance of the lubricants having three different chargeabilities deteriorates. On the other hand, when the "a" [mass %] is more than 500 mass %, the advantage described in (Advantage of Tri- or Higher Functional (Meth)acrylic Compound) above is weakened. In addition, the effects described in (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) above are weakened. In particular, the supply of scraped powder having no polarity and containing an ester bond is increased, and the balance of the lubricants having three different chargeabilities deteriorates.

The elastic deformation rate of the surface layer is preferably from 35% to 50% from the viewpoint of appropriately adjusting the supply amount of the scraped powder having no polarity and containing an ester bond at the time of repeated use. On one hand, when the elastic deformation rate is less than 35%, the surface layer is liable to be scraped, and the supply of the scraped powder having no polarity and containing an ester bond is increased, resulting in deterioration of the balance of the lubricants having three different chargeabilities. On the other hand, when the elastic deformation rate is more than 50%, the surface layer cannot be scraped, and the supply of the scraped powder having no polarity and containing an ester bond is decreased, resulting in deterioration of the balance of the lubricants having three different chargeabilities.

It is preferred that the monofunctional (meth)acrylic monomer compound have a charge-transporting site from the viewpoint of achieving both the durability and the basic electrical characteristics.

Examples of the charge-transporting site include hole-transportable structures, such as a triarylamine, hydrazone, pyrazoline, and carbazole, and electron-transporting structures, such as a condensed polycyclic quinone, diphenoquinone, and an electron-withdrawing aromatic ring having a cyano group or a nitro group. Of those, a triarylamine structure is preferred from the viewpoint of improving the charge-transporting ability in order to enhance the basic electrical characteristics as an electrophotographic photosensitive member.

However, monofunctional (meth)acrylic monomers having triarylamine structures may be aggregated due to the high stacking property of the triarylamine structures. When extreme aggregation occurs, the basic electrical characteristics deteriorate without the charge-transporting ability of the triarylamine structure being fully exhibited, and in addition, the advantages described in (Advantage 1 of Monofunctional (Meth)acrylic Compound) and (Advantage 2 of Monofunctional (Meth)acrylic Compound) above are weakened. In particular, the reducing effect of the monofunctional (meth)acrylic compound on the number of unreacted acryloyloxy groups exposed on the surface of the electrophotographic photosensitive member is weakened, and hence the unreacted acryloyloxy groups are decomposed by discharge to generate sites each having large polarity on the surface, and the surface layer is liable to adsorb moisture in the atmosphere. As a result, the adhesive property between the electrophotographic photosensitive member and any other member with which the electrophotographic photosensitive member is brought into contact in the electrophotographic process is increased, and the driving torque is liable to be increased.

From the viewpoint of improving the dispersibility of a monofunctional (meth)acrylic compound having a triarylamine structure in order to solve the above-mentioned problem in that the triarylamine structures are liable to be aggregated, the monofunctional (meth)acrylic compound is preferably a compound represented by the following formula (A1) or (A2):

(A1)

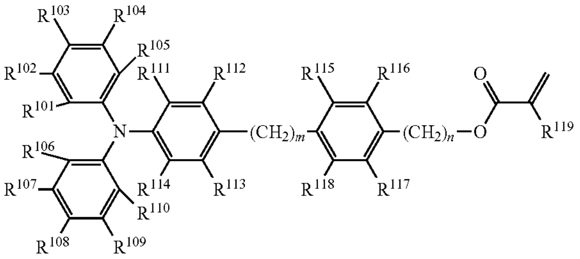

in the formula (A1), $R^{101}$ to $R^{119}$ each independently represent a hydrogen atom, a methyl group, or an ethyl group, and "m" and "n" each independently represent an integer of from 0 to 5; and (A2)

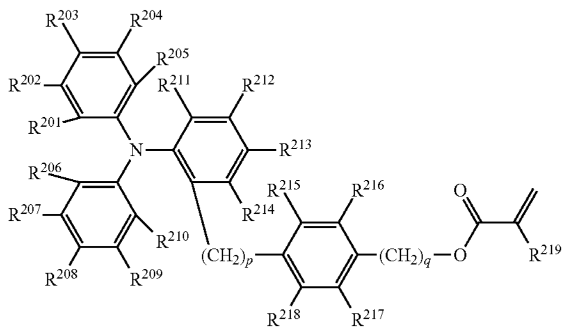

in the formula (A2), $R^{201}$ to $R^{219}$ each independently represent a hydrogen atom, a methyl group, or an ethyl group, and "p" and "q" each independently represent an integer of from 0 to 5.

In the monofunctional (meth)acrylic compound represented by the formula (A1) or (A2), the phenylene group bonded to the triarylamine moiety via an alkylene group having 0 to 5 carbon atoms gives strain to the molecular structure, to thereby suppress the aggregation caused by the high stacking property of the triarylamine structures.

Meanwhile, the stacking of the triarylamine structures may improve the charge-transporting ability in some cases. From the viewpoints of performing the optimization regarding the charge-transporting ability by appropriately allowing stacking while suppressing aggregation and improving the electrical characteristics, "m" in the formula (A1) represents preferably 2 or less, more preferably 0. "p" in the formula (A2) represents preferably 2 or less, more preferably 0. In addition, "n" in the formula (A1) represents preferably 3 or less, more preferably 2. "q" in the formula (A2) represents preferably 3 or less, more preferably 2.

Of those, from the viewpoints of the ease of polymerization and the high charge-transporting ability after polymerization, the compound represented by the formula (A1) is preferred, and $R^{119}$ more preferably represents hydrogen.

It is preferred that the surface layer contain a diphenylamine compound represented by the following formula (A3), and the content ratio of the diphenylamine compound be 0.001 mass % to 1.0 mass % with respect to the total mass of the surface layer:

(A3)

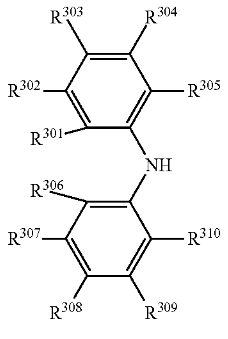

in the formula (A3), $R^{301}$ to $R^{310}$ each independently represent a hydrogen atom, a methyl group, or an ethyl group.

The diphenylamine compound represented by the formula (A3) functions as a chain transfer-type polymerization inhibitor (reference: Takayuki Otsu, On the Functions of Polymerization Inhibitors, Journal of Synthetic Organic Chemistry, Japan, Vol. 33, No. 8 (1975), P. 634-640). When the diphenylamine compound is contained in the above-mentioned amount range, it becomes easy to optimize the degree of polymerization of the surface layer. For this reason, while wear resistance suitable for the assumed high speed and long life is ensured, the supply amount of scraped powder having no polarity and containing an ester bond becomes appropriate, with the result that the balance of the lubricants having three different chargeabilities can be easily achieved. When the content ratio of the diphenylamine compound represented by the formula (A3) to the surface layer is less than 0.001 mass %, the above-mentioned function as a polymerization inhibitor is not obtained. In contrast, when the content ratio is more than 1.0 mass %, the wear resistance of the surface layer is liable to be decreased due to the suppression of polymerization and/or the balance of the lubricants having three different chargeabilities is liable to deteriorate due to the increase in supply amount of scaped powder.

It is preferred that the surface layer contain a particle A containing a metal atom. The presence of the metal atom in the surface layer makes it easy to achieve balance between the wear resistance of the surface layer and the supply of scraped powder. In addition, a discharge product generated by repeated use becomes negative due to the reducibility of the metal atom, and the hydrotalcite particle having positive chargeability can easily take in a discharge product by ion exchange, with the result that the effect described in (Advantage 1 of Hydrotalcite Particle) above is strengthened.

In addition, from the viewpoints of reducibility, dispersibility, and electric resistance, the particle A is more preferably a metal oxide particle, still more preferably an alumina particle. From the same viewpoints, the content ratio of the particle A to the surface layer is preferably 4 mass % or more and 16 mass % or less with respect to the total mass of the surface layer.

The average thickness of the surface layer is preferably 0.5 μm or more and 5 μm or less when the surface layer does not contain a conductive particle or a charge-transporting substance. On one hand, when the average thickness is less than 0.5 μm, the risk in that there is a portion not covered with the surface layer is increased, and the surface layer may not be able to exhibit its function. On the other hand, in the case where the average thickness is more than 5 μm, once the electrophotographic photosensitive member is charged in the electrophotographic process, the surface layer retains a large shared voltage due to the lack of the charge-transporting function, and a residual potential becomes extremely large, resulting in deterioration of the basic electrical characteristics. When the surface layer contains a conductive particle or a charge-transporting substance, the average thickness is preferably 0.5 μm or more and 10 μm or less, more preferably 1 μm or more and 7 μm or less.

The surface layer may be formed by: preparing a coating liquid for a surface layer containing at least one kind of the above-mentioned monofunctional (meth)acrylic compound selected from the group consisting of: a monofunctional (meth)acrylic monomer; and a monofunctional (meth) acrylic oligomer, at least one kind of the above-mentioned tri- or higher functional (meth)acrylic compound selected from the group consisting of: a tri- or higher functional (meth)acrylic monomer; and a tri- or higher functional (meth)acrylic oligomer, the respective materials described in <Photosensitive Layer> and/or <Protective Layer> above, and a solvent; forming a coating film thereof; and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The surface layer is formed as a cured film by polymerizing a composition containing the above-mentioned monofunctional (meth)acrylic compound and the above-mentioned tri- or higher functional (meth)acrylic compound. Examples of the reaction thereof include a thermal polymerization reaction, a photopolymerization reaction, and a radiation polymerization reaction.

From the viewpoint of adopting a simple polymerization method, it is more preferred that the content ratio of the diphenylamine compound represented by the formula (A3) to the surface layer be 0.1 mass % or less with respect to the total mass of the surface layer. Through setting of the content ratio to 0.1 mass % or less, when the polymerization reaction is advanced to cure the composition by applying external energy, it becomes easy to cure the composition through use of heat, light, or a UV-ray, which tends to simplify the apparatus, without using, as the external energy, a strong radiation such as an electron beam, which tends to complicate the apparatus.

<Method of Identifying Monofunctional (Meth)acrylic Compound and Tri- or Higher Functional (Meth)acrylic Compound>

The fact that the electrophotographic photosensitive member of the present invention includes a surface layer formed by polymerizing a composition containing at least one kind of monofunctional (meth)acrylic compound selected from the group consisting of: a monofunctional (meth)acrylic monomer; and a monofunctional (meth) acrylic oligomer, and at least one kind of tri- or higher functional (meth)acrylic compound selected from the group consisting of: a tri- or higher functional (meth)acrylic monomer; and a tri- or higher functional (meth)acrylic oligomer, the structural formulae of these plurality of kinds of acrylic monomers and/or acrylic oligomers, and the content ratios thereof may be identified as described below.

(1) The electrophotographic photosensitive member is immersed in chloroform. The surface layer formed by polymerizing acrylic compounds is insoluble in chloroform. Because of this, the surface layer is separated from the electrophotographic photosensitive member in chloroform, and a chloroform solution in which a layer below the surface layer has eluted is obtained.

(2) The solution is analyzed through use of chromatography, accurate mass spectrometry, nuclear magnetic resonance spectroscopy, pyrolysis-gas chromatography, or the like to identify separated components of a plurality of kinds of unreacted acrylic monomers and/or acrylic oligomers contained in the layer below the surface layer.

(3) The identified plurality of kinds of acrylic monomers and/or acrylic oligomers are prepared in predetermined amounts by synthesis, purchase, or the like and subjected to homopolymerization.

(4) Each of the polymerized plurality of kinds of polymers is analyzed by infrared absorption spectroscopy, and a calibration peak is determined as a peak used for obtaining a calibration curve in an obtained infrared absorption spectrum. In this case, under the condition that no calibration peak of other polymers can be found in a range of three times the half-width of the calibration peak, the calibration peak of each of the acrylic monomers is selected so as to maximize a peak intensity.

(5) For each polymer, a calibration range defined in a range of three times the half-width centered on the calibration peak is determined.

(6) Infrared absorption spectra when at least two or more kinds of unreacted acrylic monomers and/or acrylic oligomers are mixed at at least two or more kinds of mixing ratios and polymerized are measured, and the integral values in the above-mentioned calibration range are compared to provide a calibration curve for each of the acrylic monomers and/or acrylic oligomers.

(7) The surface layer of the photosensitive member to be identified is analyzed by infrared absorption spectroscopy, and the mixing ratio of each of the acrylic monomers and/or acrylic oligomers contained in the surface layer is calculated from an obtained infrared absorption spectrum-1 and the calibration curve of each of the acrylic monomers and/or acrylic oligomers.

(8) An infrared absorption spectrum-2 of a polymer prepared by mixing and polymerizing each of the acrylic monomers and/or acrylic oligomers at the above-mentioned mixing ratio is measured.

(9) Whether or not the integral value of a difference spectrum in the calibration range of each of the acrylic monomers and/or acrylic oligomers is 10% or less of the integral value in the calibration range of the infrared absorption spectrum-2 when the infrared absorption spectrum-1 and the infrared absorption spectrum-2 are compared to each other is recognized.

The procedures (1) and (2) in the above-mentioned identification method may be replaced by component identification using another method including literature search. In addition, when it can be recognized that the surface layer to be identified has been certainly polymerized from a plurality of kinds of acrylic monomers and/or acrylic oligomers that are candidates for identification finally in the above-mentioned procedure (9), the procedures (3) to (8) in addition to the procedures (1) and (2) may also be replaced by another method.

<Measurement of Elastic Deformation Rate>

The elastic deformation rate of the surface layer of the electrophotographic photosensitive member of the present invention was measured as described below.

Measuring device used: Fischer hardness tester (product name: H100VP-HCU, manufactured by Fisher)

Measuring environment: temperature: 23° C., humidity: 50% RH

Indenter: Vickers square pyramid diamond indenter with a facing angle of 136°

The indenter was pushed into the surface layer to apply a load up to 2 mN over 7 seconds under the above-mentioned conditions. Then, the load was gradually reduced over 7 seconds, and an indentation depth until the load reached 0 mN was continuously measured. An elastic deformation rate was determined from the results.

<Method of Identifying Diphenylamine Compound>

The fact that the surface layer of the electrophotographic photosensitive member of the present invention contains the diphenylamine compound represented by the formula (A3) and the content ratio thereof to the surface layer may be identified as described below.

(1) The surface layer of only the electrophotographic photosensitive member is scraped off and immersed in chloroform to provide a chloroform solution in which the diphenylamine compound has eluted.

(2) The solution is analyzed through use of chromatography and accurate mass spectrometry to separate the diphenylamine compound and identify the structural formula and content ratio thereof.

<Method of Identifying Particle a Containing Metal Atom>

The fact that the surface layer of the electrophotographic photosensitive member according to the present invention contains a particle A containing a metal atom, the composition of the particle A, and the content ratio thereof to the surface layer may be identified as described below.

(Identification of Composition)

(1) A cross-section of the surface layer of the photosensitive member is cut out and observed with a scanning electron microscope.

(2) The particle A present in an observation range is subjected to energy-dispersive X-ray analysis to identify the composition thereof.

(Identification of Content Ratio)

(1) The photosensitive member is immersed in chloroform. The surface layer formed by polymerizing acrylic compounds is insoluble in chloroform. Because of this, the surface layer is separated from the photosensitive member in chloroform.

(2) The separated surface layer is washed and then dried, and is subjected to thermogravimetric analysis.

(3) The weight at the time of low temperature is compared to the weight after the entire organic substance is burnt at the time of high temperature to identify the content ratio.

[Toner]

The toner according to the present invention has a feature of including a toner particle and an external additive.

Each component for forming the toner and a method of producing the toner are described below.

<Method of Producing Toner>

A method of producing a toner particle is described.

A known method may be used as the method of producing a toner particle, and a kneading and pulverization method or a wet production method may be used. From the viewpoints of uniformization of particle diameters and shape controllability, the wet production method may be preferably used. In addition, examples of the wet production method include a suspension polymerization method, a dissolution suspension method, an emulsion polymerization aggregation method, and an emulsion aggregation method, and the emulsion aggregation method may be preferably used.

In the emulsion aggregation method, materials, such as fine particles of a binder resin and fine particles of a colorant, are first dispersed and mixed in an aqueous medium containing a dispersion stabilizer. A surfactant may be added to the aqueous medium. Then, aggregation is performed until the desired particle diameter of the toner particle is obtained by adding a flocculant, and after or at the same time as the aggregation, the resin fine particles are fused together. Further, as required, thermal shape control is performed to provide a toner particle.

Here, the fine particles of the binder resin may be composite particles formed of a plurality of layers having a configuration of two or more layers of resins with different compositions. For example, the fine particles may be produced by an emulsion polymerization method, a mini-emulsion polymerization method, a phase-transfer emulsification method, or the like, or may be produced by a combination of several production methods.

When an internal additive such as a colorant is incorporated into the toner particle, the internal additive may be incorporated into resin fine particles. Alternatively, a dispersion liquid of internal additive fine particles formed of only an internal additive may be separately prepared, and the internal additive fine particles may be aggregated together when the resin fine particles are aggregated.

In addition, a toner particle having a configuration of layers with different compositions may be prepared by adding resin fine particles with different compositions with a time difference at the time of aggregation, followed by aggregation.

The following dispersion stabilizers may each be used as the dispersion stabilizer.

As an inorganic dispersion stabilizer, there are given tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina.

In addition, as an organic dispersion stabilizer, there are given polyvinyl alcohol, gelatin, methylcellulose, methylhydroxypropylcellulose, ethylcellulose, carboxymethylcellulose sodium salt, and starch.

A known cationic surfactant, anionic surfactant, or nonionic surfactant may be used as the surfactant.

Specific examples of the cationic surfactant include dodecylammonium bromide, dodecyltrimethylammonium bromide, dodecylpyridinium chloride, dodecylpyridinium bromide, and hexadecyltrimethylammonium bromide.

Specific examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, styrylphenyl polyoxyethylene ether, and monodecanoyl sucrose.

Specific examples of the anionic surfactant may include aliphatic soaps, such as sodium stearate and sodium laurate, sodium lauryl sulfate, sodium dodecylbenzene sulfonate, and sodium polyoxyethylene (2) lauryl ether sulfate.

<Binder Resin>

A binder resin for forming the toner particle is described.

Preferred examples of the binder resin may include a vinyl-based resin and a polyester resin.

Examples of the vinyl-based resin, the polyester resin, and the other binder resins may include the following resins or polymers:

homopolymers of styrene and substituted styrenes, such as polystyrene and polyvinyltoluene; styrene-based copolymers, such as a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleate copolymer; and polymethyl methacrylate, polybutyl methacrylate, polyvinyl acetate, polyethylene, polypropylene, polyvinyl butyral, a silicone resin, a polyamide resin, an epoxy resin, a polyacrylic resin, a rosin, a modified rosin, a terpene resin, a phenol resin, an aliphatic or alicyclic hydrocarbon resin, and an aromatic petroleum resin. Those binder resins may be used alone or as a mixture thereof.

The binder resin preferably contains a carboxy group, and is preferably a resin produced by using a polymerizable monomer containing a carboxy group. Examples thereof include: vinylcarboxylic acids, such as acrylic acid, methacrylic acid, a-ethyl acrylic acid, and crotonic acid; unsaturated dicarboxylic acids, such as fumaric acid, maleic acid, citraconic acid, and itaconic acid; and unsaturated dicarboxylic acid monoester derivatives, such as monoacryloyloxyethyl succinate, monomethacryloyloxyethyl succinate, monoacryloyloxyethyl phthalate, and monomethacryloyloxyethyl phthalate.

Condensation polymerization products of the following carboxylic acid components and alcohol components may each be used as the polyester resin. Examples of the carboxylic acid component include terephthalic acid, isophthalic acid, phthalic acid, fumaric acid, maleic acid, cyclohexanedicarboxylic acid, and trimellitic acid. Examples of the alcohol component include bisphenol A, hydrogenated bisphenol, an ethylene oxide adduct of bisphenol A, a propylene oxide adduct of bisphenol A, glycerin, trimethylolpropane, and pentaerythritol.

In addition, the polyester resin may be a polyester resin containing a urea group. It is preferred that a carboxy group at, for example, a terminal of the polyester resin be not capped.

<Crosslinking Agent>

A crosslinking agent may be added at the time of the polymerization of the polymerizable monomer for controlling the molecular weight of the binder resin for forming the toner particle.

Examples thereof include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400, and #600, dipropylene glycol diacrylate, polypropylene glycol diacrylate, and a polyester-type diacrylate (MANDA, Nippon Kayaku Co., Ltd.), and compounds obtained by changing those acrylates to methacrylates.

The addition amount of the crosslinking agent is preferably 0.001 part by mass or more and 15.000 parts by mass or less with respect to 100 parts by mass of the polymerizable monomer.

<Release Agent>

It is preferred that a release agent be incorporated as one of the materials for forming a toner particle. In particular, when an ester wax having a melting point of 60° C. or more and 90° C. or less is used, a plasticizing effect is easily obtained because of the excellent compatibility of the ester wax with the binder resin.

Examples of the ester wax include: waxes each including a fatty acid ester as a main component, such as a carnauba wax and a montanic acid ester wax; a wax obtained by removing part or the whole of an acid component from a fatty acid ester such as a deacidified carnauba wax; a methyl ester compound having a hydroxy group obtained by, for example, hydrogenating a plant oil and fat; saturated fatty acid monoesters, such as stearyl stearate and behenyl behenate; diesterified products of a saturated aliphatic dicarboxylic acid and a saturated aliphatic alcohol, such as dibehenyl sebacate, distearyl dodecanedioate, and distearyl octadecanedioate; and diesterified products of a saturated aliphatic diol and a saturated aliphatic monocarboxylic acid, such as nonanediol dibehenate and dodecanediol distearate.

Of those waxes, a bifunctional ester wax (diester) having two ester bonds in a molecular structure thereof is preferably included.

The bifunctional ester wax is an ester compound of a dihydric alcohol and an aliphatic monocarboxylic acid, or an ester compound of a divalent carboxylic acid and an aliphatic monoalcohol.

Specific examples of the aliphatic monocarboxylic acid include myristic acid, palmitic acid, stearic acid, arachidic acid, behenic acid, lignoceric acid, cerotic acid, montanic acid, melissic acid, oleic acid, vaccenic acid, linoleic acid, and linolenic acid.

Specific examples of the aliphatic monoalcohol include myristyl alcohol, cetanol, stearyl alcohol, arachidyl alcohol, behenyl alcohol, tetracosanol, hexacosanol, octacosanol, and triacontanol.

Specific examples of the divalent carboxylic acid include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid, and terephthalic acid.

Specific examples of the dihydric alcohol include ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexane dimethanol, spiroglycol, 1,4-phenylene glycol, bisphenol A, and hydrogenated bisphenol A.

Examples of the other release agent that may be used include: a petroleum-based wax, such as a paraffin wax, a microcrystalline wax, or petrolatum, and derivatives thereof; a montan wax and derivatives thereof; a hydrocarbon wax obtained by a Fischer-Tropsch method and derivatives thereof; a polyolefin wax, such as polyethylene or polypropylene, and derivatives thereof; a natural wax, such as a carnauba wax or a candelilla wax, and derivatives thereof; a higher aliphatic alcohol; and a fatty acid, such as stearic acid or palmitic acid, or compounds thereof.

The content of the release agent is preferably 5.0 parts by mass or more and 20.0 parts by mass or less with respect to 100.0 parts by mass of the binder resin or the polymerizable monomer.

<Colorant>

When a colorant is incorporated into the toner particle, the colorant is not particularly limited, and known colorants described below may be used.

As yellow pigments, there are used yellow iron oxide, naples yellow, condensed azo compounds, such as Naphthol Yellow S, Hansa Yellow G, Hansa Yellow 10G, Benzidine Yellow G, Benzidine Yellow GR, quinoline yellow lake, Permanent yellow NCG, and tartrazine lake, isoindolinone compounds, anthraquinone compounds, azo metal complexes, methine compounds, and allyl amide compounds. Specific examples thereof include the following pigments:

C.I. Pigment Yellow 12, 13, 14, 15, 17, 62, 74, 83, 93, 94, 95, 109, 110, 111, 128, 129, 147, 155, 168, and 180.

As red pigments, there are given colcothar, condensed azo compounds, such as Permanent Red 4R, lithol red, pyrazolone red, watching red calcium salt, lake red C, lake red D, Brilliant Carmine 6B, Brilliant Carmine 3B, eosin lake, rhodamine lake B, and alizarin lake, diketopyrrolopyrrole compounds, anthraquinone compounds, quinacridone compounds, basic dye lake compounds, naphthol compounds, benzimidazolone compounds, thioindigo compounds, and perylene compounds. Specific examples thereof include the following pigments:

C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

As blue pigments, there are given alkali blue lake, Victoria blue lake, phthalocyanine blue, metal-free phthalocyanine blue, partially chlorinated phthalocyanine blue, fast sky blue, copper phthalocyanine compounds such as indanthrene blue BG, and derivatives thereof, anthraquinone compounds, and basic dye lake compounds. Specific examples thereof include the following pigments:

C.I. Pigment Blue 1, 7, 15, 15:1, 15:2, 15:3, 15:4, 60, 62, and 66.

As black pigments, there are given carbon black and aniline black. Those colorants may be used alone or as a mixture thereof, and in the state of a solid solution.

The content of the colorant is preferably 3.0 parts by mass or more and 15.0 parts by mass or less with respect to 100.0 parts by mass of the binder resin or the polymerizable monomer.

<Charge Control Agent and Charge Control Resin>

The toner particle may contain a charge control agent. A known charge control agent may be used as the charge control agent. In particular, a charge control agent having a high charging speed and being capable of stably maintaining a constant charge quantity is preferred.

Examples of the charge control agent that controls a toner particle so that the particle may be negatively chargeable include the following agents:

as organometallic compounds and chelate compounds, a monoazo metal compound, an acetylacetone metal compound, and aromatic oxycarboxylic acid-, aromatic dicarboxylic acid-, oxycarboxylic acid-, and dicarboxylic acid-based metal compounds. Other examples thereof include aromatic oxycarboxylic acids, and aromatic mono- and polycarboxylic acids, and metallic salts, anhydrides, or esters thereof, and phenol derivatives such as bisphenol. Further, there are given a urea derivative, a salicylic acid-based compound containing a metal, a naphthoic acid-based compound containing a metal, a boron compound, a quaternary ammonium salt, and a calixarene.

Meanwhile, examples of the charge control agent that controls a toner particle so that the particle may be positively chargeable include the following agents: a modified nigrosine compound; a guanidine compound; an imidazole compound; quaternary ammonium salts, such as a tributylbenzylammonium-1-hydroxy-4-naphtosulfonate and tetrabutylammonium tetrafluoroborate, and onium salts that are analogs of the above-mentioned compounds such as a phosphonium salt, and lake pigments thereof; a triphenylmethane dye and a lake pigment thereof (examples of a laking agent include phosphotungstic acid, phosphomolybdic acid, phosphotungstic molybdic acid, tannic acid, lauric acid, gallic acid, a ferricyanide, and a ferrocyanide); a metal salt of a higher fatty acid; and a resin-based charge control agent.

The charge control agents may be incorporated alone or in combination thereof.

The content of the charge control agent is preferably 0.01 part by mass or more and 10.00 parts by mass or less with respect to 100.00 parts by mass of the binder resin or the polymerizable monomer.

<External Additive>

The toner according to the present invention contains a hydrotalcite particle as an additive, and in the filter fitting analysis of STEM-EDS analysis, it is required that the hydrotalcite particle contain fluorine.

The hydrotalcite particle is generally represented by the following structural formula (1):

$$M^{2+}_{y}M^{3+}_{x}(OH)_2A^{n-}_{(x/n)}\cdot mH_2O \qquad \text{Formula (1)}$$

where $0<x\leq 0.5$, $y=1-x$, and $m\geq 0$.

The $M^{2+}$ and the $M^{3+}$ represent divalent and trivalent metals, respectively.

The $M^{2+}$ preferably represents at least one divalent metal ion selected from the group consisting of: Mg; Zn; Ca; Ba; Ni; Sr; Cu; and Fe. The $M^{3+}$ preferably represents at least one trivalent metal ion selected from the group consisting of: Al; B; Ga; Fe; Co; and In.

The $A^{n-}$ represents an n-valent anion, and examples thereof include $CO_3^{2-}$, $OH^-$, $Cl^-$, $I^-$, $F^-$, $Br^-$, $SO_4^{2-}$, $HCO_3^-$, $CH_3COO^-$, and $NO_3^-$. Those anions may be present alone or in a plurality of kinds thereof.

The hydrotalcite particle according to the present invention has a feature of containing fluorine. There is no particular limitation on a method of incorporating fluorine into the hydrotalcite particle, and examples thereof include a method involving treating the hydrotalcite particle with a coupling treatment agent containing fluorine and a method involving treating the hydrotalcite particle in an aqueous solution containing a fluoride ion. A method involving performing wet treatment in an aqueous solution containing a fluoride ion is preferred from the viewpoint of uniform treatment. In the present invention, it is preferred that magnesium be contained as the divalent metal ion $M^{2+}$, and that aluminum be contained as the trivalent metal ion $M^{3+}$. That is, the hydrotalcite particle of the present invention is preferably a hydrotalcite particle containing fluorine, magnesium, and aluminum.

The hydrotalcite particle may be a solid solution containing a plurality of different elements. In addition, the hydrotalcite particles may contain a trace amount of a monovalent metal.

The number-average particle diameter of primary particles of the hydrotalcite particles is preferably 60 nm or more and 1,000 nm or less, more preferably 60 nm or more and 800 nm or less.

When the number-average particle diameter of primary particles of the hydrotalcite particles is more than 1,000 nm, the fluidity of the toner is liable to be decreased. As a result, a decrease in chargeability at the time of the endurance is liable to occur.

The hydrotalcite particle may be subjected to hydrophobic treatment with a surface treatment agent separately from the fluorine treatment. Higher fatty acids, coupling agents, esters, and oils such as silicone oil may each be used as the surface treatment agent. Of those, higher fatty acids are preferably used. Specific examples thereof include stearic acid, oleic acid, and lauric acid.

When the content ratio of the hydrotalcite particle to the toner is represented by "b" [mass %], the "b" [mass %] is preferably 0.010 mass % to 3.000 mass %.

On one hand, when the "b" [mass %] is less than 0.010 mass %, the amount of the hydrotalcite particle supplied onto the surface layer of the photosensitive member when the toner is developed is small, and hence the effects described in (Advantage 1 of Hydrotalcite Particle) and (Advantage 2 of Hydrotalcite Particle) above are weakened. On the other hand, when the "b" [mass %] is more than 3.000 mass %, the supply of the hydrotalcite particle onto the surface layer is increased, and the balance of the lubricants having three different chargeabilities deteriorates. As a result, the effects described in (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) above are weakened.

In addition, when the "b" [mass %] is more than 3.000 mass %, the fluidity of the toner is liable to be decreased, and adverse effects such as deterioration of developability are liable to occur.

In the filter fitting analysis of STEM-EDS analysis, the hydrotalcite particle contains magnesium and aluminum, and in the filter fitting analysis of the STEM-EDS analysis, the element ratio (atomic number concentration ratio) Mg/Al of magnesium to aluminum is preferably from 1.5 to 4.0, more preferably from 1.6 to 3.8.

The element ratio (atomic number concentration ratio) F/Al of fluorine to aluminum in the hydrotalcite particle is preferably from 0.03 to 0.70 in the filter fitting analysis of the STEM-EDS analysis.

On one hand, when the F/Al is less than 0.03, the amount of fluorine supplied onto the surface layer of the photosensitive member when the toner is developed is small, and hence the effects described in (Advantage 1 of Hydrotalcite Particle containing Fluorine) and (Advantage 2 of Hydrotalcite Particle containing Fluorine) above are weakened. On the other hand, when the F/Al is more than 0.70, the supply of fluorine onto the surface layer is increased, and the balance of the lubricants having three different chargeabilities deteriorates. As a result, the effects described in (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) above are weakened.

It is preferred that fluorine be present inside the hydrotalcite particle in the line analysis of the STEM-EDS analysis.

When fluorine is contained inside the hydrotalcite particle, fluorine is supplied onto the photosensitive member in exchange for the adsorption of a discharge product by ion exchange. As a result, the supply of fluorine onto the photosensitive member is easily performed appropriately in conjunction with the progress of the discharge to the photosensitive member by repeated use. Accordingly, the balance of the lubricants having three different chargeabilities is improved, and the effects described in (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) above are strengthened.

<Method of Identifying Hydrotalcite Particle>

Identification of the hydrotalcite particle as an external additive may be performed by combining the shape observation by scanning electron microscopy (SEM) and elemental analysis by energy-dispersive X-ray spectroscopy (EDS).

A toner is observed in a field of view enlarged by up to 50,000 times with a scanning electron microscope "S-4800" (product name; manufactured by Hitachi, Ltd.). The surface of the toner particle is brought into focus, and the external additive to be discriminated is observed. EDS analysis of the external additive to be discriminated is performed, thereby being capable of identifying the hydrotalcite particle from the kinds of element peaks.

When an element peak of at least one metal selected from the group consisting of: Mg; Zn; Ca; Ba; Ni; Sr; Cu; and Fe, which are metals that may form hydrotalcite particles, and an element peak of at least one metal selected from the group consisting of: Al; B; Ga; Fe; Co; and In are observed as the element peaks, the presence of the hydrotalcite particle containing the above-mentioned two kinds of metals can be analogized.

A specimen of the hydrotalcite particle analogized by the EDS analysis is separately prepared, and the shape observation by the SEM and the EDS analysis are performed. The analysis results of the specimen are compared to those of the particles to be discriminated to recognize whether or not the analysis results of the specimen are matched with those of the particle to be discriminated, to thereby determine whether or not the particle are a hydrotalcite particle.

<Method of Measuring Content Ratio "b" [Mass %] of Hydrotalcite Particle to Toner>

The content ratio "b" [mass %] of the hydrotalcite particle to the toner may be quantified through use of a calibration curve created from a standard sample by X-ray fluorescence analysis. X-ray fluorescence of each element is measured in accordance with JIS K 0119-1969, and the measurement is performed specifically as described below.

A wavelength dispersive fluorescent X-ray analyzer "Axios" (manufactured by PANalytical), and dedicated software "Super-Q ver. 4.0F" (manufactured by PANalytical) included in the apparatus for setting measurement conditions and analyzing measurement data are used as a measuring apparatus. Rh is used as the anode of an X-ray tube, and the measurement is performed in a vacuum atmosphere at a measurement diameter (collimator mask diameter) of 27 mm for a measurement time of 10 seconds. In addition, when the amount of a light element is measured, an X-ray is detected with a proportional counter (PC), and when the amount of a heavy element is measured, an X-ray is detected with a scintillation counter (SC).

A pellet obtained by putting about 4 g of a toner in a dedicated aluminum ring for pressing, flattening the toner, pressurizing the toner at 20 MPa for 60 seconds through use of a tablet compacting machine, and forming the resultant to a thickness of about 2 mm and a diameter of about 39 mm is used as a measurement sample. "BRE-32" manufactured by Maekawa Testing Machine MFG, Co., Ltd. was used as the tablet compacting machine.

The measurement is performed under the foregoing conditions. An element is identified based on the resultant X-ray peak position, and its concentration is calculated from a counting rate (unit: cps) serving as the number of X-ray photons per unit time.

A separately prepared specimen of the hydrotalcite particle is added at 0.10 part by mass with respect to 100 parts by mass of a toner particle, and the mixture is sufficiently mixed with a coffee mill. In the same manner, the hydrotalcite particles are mixed with the toner particle at 0.20 part by mass and 0.50 part by mass, respectively, and the mixtures are used as samples for a calibration curve.

For each of the samples, a counting rate (unit: cps) derived from a metal element in hydrotalcite is measured. In this case, the acceleration voltage and current value of an X-ray generator are set to 24 kV and 100 mA, respectively. A calibration curve with a linear function is obtained through use of the counting rate of the obtained X-ray as a vertical axis and the addition amount of the hydrotalcite particle in each of the samples for a calibration curve as a horizontal axis.

Next, the toner to be analyzed is pelletized as described above through use of the tablet compacting machine, and the counting rate derived from the metal element in the hydrotalcite is measured. Then, the content ratio "b" [mass %] of the hydrotalcite particle in the toner is determined from the above-mentioned calibration curve.

<Method of Measuring Each Element Ratio of Polyvalent Metal Element and Hydrotalcite Particle in Toner Particle>

The STEM-EDS analysis according to the present invention is described below.

Measurement of each element ratio of polyvalent metal elements and hydrotalcite particles in the toner particle is performed by EDS mapping measurement of the toner using a scanning transmission electron microscope (STEM). The EDS mapping measurement has spectral data for each pixel in an analysis area. Through use of a silicon drift detector having a large detection element area, the EDS mapping can be measured with high sensitivity.

When statistical analysis is performed on the spectral data of each pixel obtained by the EDS mapping measurement, principal component mapping in which pixels with similar spectra are extracted can be obtained, and mapping in which components are specified can be performed.

The production of a sample for observation is performed by the following procedure.

0.5 g of a toner is weighed and left to stand still for 2 minutes under a load of 40 kN through use of a Newton press in a columnar mold having a diameter of 8 mm to produce a columnar toner pellet having a diameter of 8 mm and a thickness of about 1 mm. A slice having a thickness of 200 nm is produced from the toner pellet with an ultramicrotome (Leica, FC7).

The STEM-EDS analysis was performed with the following devices and conditions.

Measuring device 1 used: Scanning transmission electron microscope; JEM-2800 manufactured by JEOL Ltd.

Measuring device 2 used: EDS detector; JED-2300T Dry SD100GV Detector (detection element area: 100 $mm^2$) manufactured by JEOL Ltd.

Measuring device 3 used: EDS analyzer; NORAN System 7 manufactured by Thermo Fisher Scientific (Conditions for STEM-EDS)

STEM acceleration voltage: 200 kV

Magnification: 20,000 times

Probe size: 1 nm

STEM image size; 1,024 pixels×1,024 pixels (EDS element mapping image at the same position is acquired.)

EDS mapping size; 256 pixels×256 pixels, Dwell Time; 30 μs, cumulative number; 100 frames Calculation of the polyvalent metal element ratio in the toner particle and each element ratio in the hydrotalcite particles based on multivariate analysis was performed as described below.

The filter fitting analysis according to the present invention is described below.

EDS mapping was obtained with the above-mentioned STEM-EDS analyzing device. Then, the collected spectral mapping data was subjected to multivariate analysis through use of a COMPASS (PCA) mode in a measurement command of the above-mentioned NORAN System 7 to extract principal component map images.

In this case, set values were as described below.

Kernel size: 3×3

Quantitative map setting: high (slow)

Filter fitting type: high precision (slow)

At the same time, the area ratio of each extracted principal component to an EDS measurement field of view is calculated by this operation. The EDS spectrum of each principal component thus obtained was subjected to quantitative analysis by the Cliff Lorimer method.

The distinction between the toner particle portion and the hydrotalcite particle is made based on the results of the above-mentioned quantitative analysis of the resultant STEM-EDS principal component mapping. The particle concerned may be identified as a hydrotalcite particle based on the particle size, shape, content of polyvalent metals, such as aluminum and magnesium, and quantitative ratio thereof.

In addition, when fluorine is present in the hydrotalcite particle, the particle concerned may be determined to be a hydrotalcite particle containing fluorine by the following method.

(Method of Analyzing Fluorine Contained in Hydrotalcite Particle)

Analysis of fluorine contained in the hydrotalcite particle is performed based on the mapping data by the STEM-EDS analysis obtained by the above-mentioned method.

In the EDS spectrum obtained from the principal component map image of the particle concerned extracted by COMPASS, when fluorine is present at a peak intensity that is 1.5 times or more the background intensity, it is determined that fluorine is contained in the particles concerned.

(Method of Analyzing Fluorine and Aluminum Inside Hydrotalcite Particle)

Analysis of fluorine and aluminum inside the hydrotalcite particles is performed based on the mapping data by the STEM-EDS analysis obtained by the above-mentioned method. Specifically, EDS line analysis in a normal direction of the surface of each of the particles concerned is performed to analyze fluorine and aluminum present therein.

Figure 2A:
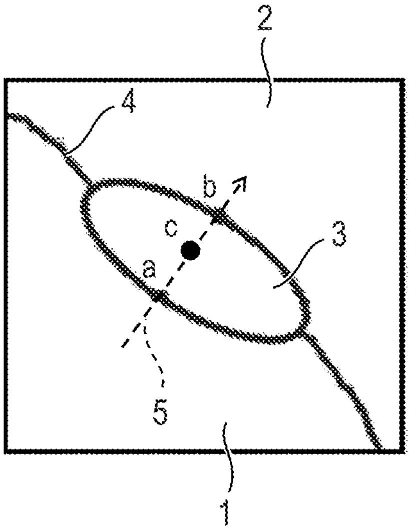
FIG. 2A is a schematic diagram of line analysis of STEM-EDS analysis.

A schematic diagram of the line analysis is shown in FIG. 2A. Line analysis is performed in a hydrotalcite particle 3 adjacent to a toner particle 1 and a toner particle 2 in a direction normal to the outer periphery of the hydrotalcite particle 3, that is, in a direction 5. There is shown a boundary 4 between the toner particles.

The range in which the hydrotalcite particle is present in the acquired STEM image is selected with a rectangular selection tool, and line analysis is performed under the following conditions.

The range in which the particle concerned was present in the acquired STEM image was selected with a rectangular selection tool, and line analysis was performed under the following conditions.

(Line Analysis Conditions)

STEM magnification: 800,000 times

Line length: 200 nm

Line width: 30 nm

Number of line divisions: 100 points (intensity measurement for each 2 nm)

When fluorine or aluminum is present at an element peak intensity that is 1.5 times or more the background intensity in the EDS spectrum of the hydrotalcite particle, and when the element peak intensity of fluorine or aluminum at both end portions (point "a" and point "b" in FIG. 2A) of the hydrotalcite particle in the line analysis each does not exceed 3.0 times the peak intensity at a point "c", the element is determined to be contained inside the hydrotalcite particle. The point "c" is defined as the midpoint of a line segment ab (that is, the midpoint of both the end portions).

Figure 2B:
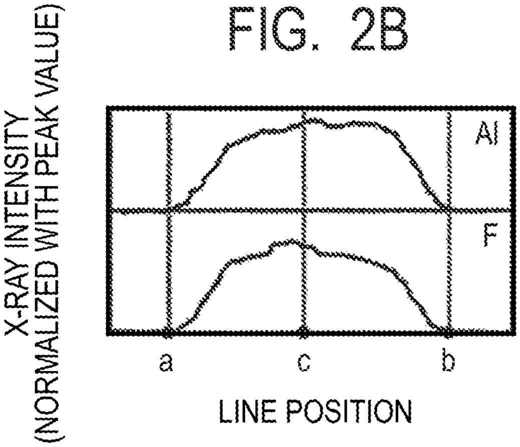
FIG. 2B is a graph for showing an example of X-ray intensities of fluorine and aluminum obtained by the line analysis.
Figure 2C:
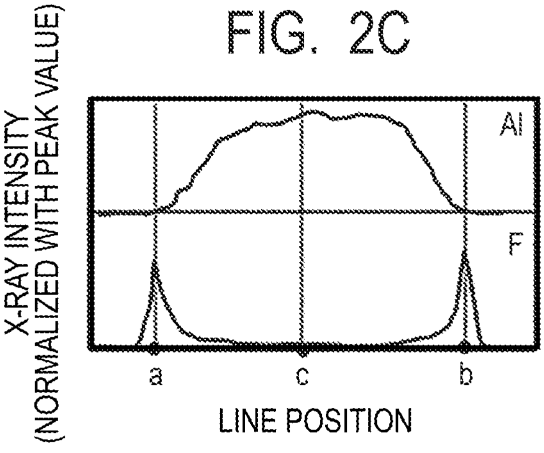
FIG. 2C is a graph for showing another example of X-ray intensities of fluorine and aluminum obtained by the line analysis.

Examples of X-ray intensities of fluorine and aluminum obtained by the line analysis are shown in FIG. 2B and FIG. 2C. When the hydrotalcite particles contain fluorine and aluminum therein, a graph of the X-ray intensity normalized by the peak intensity has a shape as in FIG. 2B. When the hydrotalcite particles contain fluorine derived from a surface treatment agent, a graph of the X-ray intensity normalized by the peak intensity has peaks in the vicinity of the points "a" and "b" of both the end portions in a graph of fluorine as in FIG. 2C. When the X-ray intensity derived from fluorine and aluminum in the line analysis is recognized, it can be recognized that the hydrotalcite particles contain fluorine and aluminum therein.

(Method of Calculating Element Ratio (Atomic Number Concentration Ratio) Mg/Al of Magnesium to Aluminum)

The element ratio (atomic number concentration ratio) Mg/Al of magnesium to aluminum in the hydrotalcite particle is calculated based on the mapping data by the STEM-EDS analysis obtained by the above-mentioned method. In the principal component map image of the hydrotalcite particles extracted by the above-mentioned method, the element amounts (atomic number concentrations) of magnesium and aluminum are quantified, and the element ratio (atomic number concentration ratio) of magnesium to aluminum is calculated. The element ratio of magnesium to aluminum in the hydrotalcite particle is calculated by acquiring the above-mentioned mapping data in a plurality of fields of view and taking the arithmetic average of 100 or more particles concerned.

(Method of Calculating Element Ratio (Atomic Number Concentration Ratio) F/Al of Fluorine to Aluminum)

The element ratio (atomic number concentration ratio) F/Al of fluorine to aluminum in the hydrotalcite particle is calculated based on the mapping data by the STEM-EDS analysis obtained by the above-mentioned method. In the principal component map image of the hydrotalcite particle extracted by the above-mentioned method, the element amounts (atomic number concentrations) of fluorine and aluminum are quantified, and the element ratio (atomic number concentration ratio) of fluorine to aluminum is calculated. The element ratio (atomic number concentration ratio) F/Al of fluorine to aluminum in the hydrotalcite particle is calculated by acquiring the above-mentioned mapping data in a plurality of fields of view and taking the arithmetic average of 100 or more particles concerned.

<Method of measuring Number-average Particle Diameter of Hydrotalcite Particle>

The number-average particle diameter of the hydrotalcite particles is measured through use of a scanning electron microscope "S-4800" (product name; manufactured by Hitachi, Ltd.). A toner having an external additive externally added thereto is observed to measure the long diameters of 100 primary particles of the external additive at random in a field of view enlarged by up to 200,000 times, to thereby determine a number-average particle diameter. The magnification of observation is appropriately adjusted in accordance with the size of the external additive. Here, a particle that appears to be a single particle is judged as a primary particle in terms of observation.

<Method of Measuring Median Diameter Based on Volume of Toner>

The median diameter based on a volume of the toner is calculated as described below. A precision particle size distribution measuring apparatus based on a pore electrical resistance method with a 100-micrometer aperture tube "Coulter Counter Multisizer 3" (trademark, manufactured by Beckman Coulter, Inc.) is used as a measuring apparatus. Dedicated software "Beckman Coulter Multisizer 3 Version 3.51" (manufactured by Beckman Coulter, Inc.) attached thereto is used for setting measurement conditions and analyzing measurement data. The measurement is performed with the number of effective measurement channels of 25,000.

An electrolyte aqueous solution prepared by dissolving special grade sodium chloride in ion-exchanged water so as to have a concentration of about 1 mass %, for example, "ISOTON II" (manufactured by Beckman Coulter, Inc.) may be used in the measurement.

The dedicated software is set as described below prior to the measurement and the analysis.

In the "Change Standard Operating Method (SOMME)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a "Threshold/Measure Noise Level" button. In addition, a current is set to 1,600 μA, a gain is set to 2, and an electrolyte solution is set to ISOTON II, and a check mark is placed in a check box "Flush Aperture Tube after Each Run."

In the "Convert Pulses to Size Settings" screen of the dedicated software, a bin spacing is set to a logarithmic particle diameter, the number of particle diameter bins is set to 256, and a particle diameter range is set to the range of from 2 μm to 60 μm.

A specific measurement method is as described below.

(1) About 200 mL of the electrolyte aqueous solution is loaded into a 250 mL round-bottom beaker made of glass dedicated for Multisizer 3. The beaker is set in a sample stand, and the electrolyte aqueous solution in the beaker is stirred with a stirrer rod at 24 revolutions/sec in a counter-clockwise direction. Then, dirt and bubbles in the aperture tube are removed by the "Flush Aperture Tube" function of the dedicated software.

(2) About 30 mL of the electrolyte aqueous solution is loaded into a 100 mL flat-bottom beaker made of glass. About 0.3 mL of a diluted solution prepared by diluting "Contaminon N" (10 mass % aqueous solution of a neutral detergent for washing a precision measuring device formed of a nonionic surfactant, an anionic surfactant, and an organic builder and having a pH of 7, manufactured by Wako Pure Chemical Industries, Ltd.) with ion-exchanged water by about three parts by mass fold is added as a dispersant to the electrolyte aqueous solution.

(3) An ultrasonic dispersing unit "Ultrasonic Dispersion System Tetra 150" (manufactured by Nikkaki Bios Co., Ltd.) in which two oscillators each having an oscillatory frequency of 50 kHz are built so as to be out of phase by 180° and which has an electrical output of 120 W is prepared. About 3.3 L of ion-exchanged water is loaded into a water tank of the ultrasonic dispersing unit. About 2 mL of Contaminon Nis loaded into the water tank.

(4) The beaker in the section (2) is set in the beaker fixing hole of the ultrasonic dispersing unit, and the ultrasonic dispersing unit is operated. Then, the height position of the beaker is adjusted in order that the liquid surface of the electrolyte aqueous solution in the beaker may resonate with an ultrasonic wave from the ultrasonic dispersing unit to the fullest extent possible.

(5) About 10 mg of the toner is gradually added to and dispersed in the electrolyte aqueous solution in the beaker in the section (4) under a state in which the electrolyte aqueous solution is irradiated with the ultrasonic wave. Then, the ultrasonic dispersion treatment is continued for additional 60 seconds. The temperature of water in the water tank is appropriately adjusted so as to be 10° C. or more and 40° C. or less upon ultrasonic dispersion.

(6) The electrolyte aqueous solution in the section (5) in which the toner has been dispersed is dropped with a pipette to the round-bottom beaker in the section (1) placed in the sample stand, and the measurement concentration is adjusted so as to be about 5%. Then, measurement is performed until 50,000 particles are measured.

(7) The measurement data is analyzed with the above-mentioned dedicated software included in the device to calculate a median diameter based on a volume.

[Process Cartridge and Electrophotographic Apparatus]

A process cartridge of the present invention includes the electrophotographic photosensitive member described above, a toner, and a developing member that supplies the toner to the electrophotographic photosensitive member, and is removably mounted onto a main body of an electrophotographic apparatus.

In addition, the electrophotographic apparatus of the present invention includes the above-mentioned process cartridge.

An example of the schematic construction of an electrophotographic apparatus including a process cartridge including an electrophotographic photosensitive member, a toner, and a developing member is illustrated in FIG. 1.

A cylindrical electrophotographic photosensitive member 101 is rotationally driven about a shaft 102 in a direction indicated by the arrow at a predetermined peripheral speed. The surface of the electrophotographic photosensitive member 101 is charged to a predetermined positive or negative potential by a charging member 103. In FIG. 1, a roller charging system based on a roller-type charging member is illustrated, but a charging system such as a corona charging system, a proximity charging system, or an injection charging system may be adopted. The charged surface of the electrophotographic photosensitive member 101 is irradiated with exposure light 104 from an exposing member (not shown), and hence an electrostatic latent image corresponding to target image information is formed thereon. The electrostatic latent image formed on the surface of the electrophotographic photosensitive member 101 is developed with a toner stored in a developing member 105, and hence a toner image is formed on the surface of the electrophotographic photosensitive member 101. The toner image formed on the surface of the electrophotographic photosensitive member 101 is transferred onto a transfer material 107 by a transferring member 106. The transfer material 107 onto which the toner image has been transferred is conveyed to a fixing unit 108, is subjected to a treatment for fixing the toner image, and is printed out to the outside of the electrophotographic apparatus. The electrophotographic apparatus may include a cleaning member 109 for removing a deposit such as the toner remaining on the surface of the electrophotographic photosensitive member 101 after the transfer. In addition, a so-called cleaner-less system configured to remove the deposit with the developing member or the like without separate arrangement of the cleaning member may be used. The electrophotographic apparatus may include an electricity-removing mechanism configured to subject the surface of the electrophotographic photosensitive member 101 to an electricity-removing treatment with pre-exposure light 110 from a pre-exposing member (not shown). In addition, a guiding member 112 such as a rail may be arranged for removably mounting a process cartridge 111 of the present invention onto the main body of an electrophotographic apparatus.

The process cartridge of the present invention can be used in, for example, a laser beam printer, an LED printer, or a copying machine.

<Surface Layer of Electrophotographic Photosensitive Member Held by Process Cartridge and External Additive of Toner>

In the process cartridge of the present invention, as described in the [Electrophotographic Photosensitive Member], a surface layer of the electrophotographic photosensitive member is required to be formed by polymerizing a composition containing at least one kind of monofunctional (meth)acrylic compound selected from the group consisting of: a monofunctional (meth)acrylic monomer; and a monofunctional (meth)acrylic oligomer, and at least one kind of tri- or higher functional (meth)acrylic compound selected from the group consisting of: a tri- or higher functional (meth)acrylic monomer; and a tri- or higher functional (meth)acrylic oligomer.

In addition, in the process cartridge of the present invention, as described in the [Toner], the toner contains hydrotalcite particles as an external additive, and in the filter fitting analysis of STEM-EDS analysis, it is required that the hydrotalcite particles contain fluorine.

Further, it is preferred that the electrophotographic photosensitive member and/or the toner have the respective features described in [Electrophotographic Photosensitive Member] and/or [Toner] above.

In particular, it is preferred that, in the process cartridge of the present invention, when a content ratio of the monofunctional (meth)acrylic compound to the tri- or higher functional (meth)acrylic compound in the composition on the surface layer of the electrophotographic photosensitive member is represented by "a" [mass %], and a content ratio of the hydrotalcite particle to the toner in a toner additive is represented by "b" [mass %], the "a" and the "b" satisfy a relationship represented by the following formula (E1).

$$100 \leq a/b \leq 4{,}000 \quad \text{Formula (E1)}$$

When the "a" and "b" satisfy the above-mentioned formula, the supply balance of the lubricants having three different charging polarities onto the surface layer of the electrophotographic photosensitive member is improved, and the effects described in (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) above are strengthened. On one hand, when the a/b is less than 100, the amount of scraped powder having no polarity and containing an ester bond is decreased with respect to the amount of the hydrotalcite particles, and the above-mentioned balance is liable to be lost. On the other hand, when the a/b is more than 4,000, the amount of scraped powder having no polarity and containing an ester bond is increased with respect to the amount of the hydrotalcite particles, and the above-mentioned balance is also liable to be lost.

In addition, it is preferred that the process cartridge of the present invention satisfy the following three features described in <External Additive> above while satisfying the formula (E1).

The "b" [mass %] is 0.01 mass % or more and 3.0 mass % or less.

The hydrotalcite particle contains magnesium and aluminum in the filter fitting analysis of the STEM-EDS analysis, and the element ratio (atomic number concentration ratio) Mg/Al of magnesium to aluminum is 1.5 or more and 4.0 or less.

The element ratio (atomic number concentration ratio) F/Al of fluorine to aluminum in the hydrotalcite particle is from 0.03 to 0.70 in the filter fitting analysis of the STEM-EDS analysis.

When those four features in total are satisfied, the supply balance of the fluorine having negative chargeability, the hydrotalcite particles having positive chargeability, and the scraped powder having no polarity is improved, and the effects described in the (Advantage of Presence of Three Lubricants: Scraped Powder of Surface Layer; Hydrotalcite Particle; and Fluorine) and (Behavior of Three Kinds of Lubricants with respect to Print Percentage and Image Density of Printed Image at time of Repeated Use) are further strengthened.

EXAMPLES

The present invention is described in more detail below by way of Examples and Comparative Examples. The present invention is by no means limited to the following Examples without departing from the gist of the present invention. In the description in the following Examples, "part(s)" is by mass unless otherwise specified.

The thicknesses of the respective layers of electrophotographic photosensitive members of Examples and Comparative Examples except a charge-generating layer were each determined by a method including using an eddy current-type thickness meter (Fischerscope (trademark), manufactured by Fischer Instruments K.K.) or a method including converting the mass of the layer per unit area into the thickness thereof through use of the specific gravity thereof. The thickness of the charge-generating layer was determined as described below. That is, the Macbeth density value of the electrophotographic photosensitive member was measured by pressing a spectral densitometer (product name: X-Rite 504/508, manufactured by X-Rite Inc.) against the surface of the electrophotographic photosensitive member. Through use of a calibration curve obtained in advance from the Macbeth density value and the value of the thickness measured by the observation of a sectional SEM image of the layer, the thickness was calculated from the measured Macbeth density value.

[Preparation of Coating Liquid for Undercoat Layer]

100 Parts of rutile-type titanium oxide particles (product name: MT-600B, average primary particle diameter: 50 nm, manufactured by Tayca Corporation) were stirred and mixed with 500 parts of toluene, and 5.0 parts of vinyltrimethoxysilane (product name: KBM-1003, manufactured by Shin-Etsu Chemical Co., Ltd.) was added to the mixture, followed by stirring for 8 hours. After that, toluene was evaporated by distillation under reduced pressure, and the residue was dried at 120° C. for 3 hours. Thus, rutile-type titanium oxide particles whose surfaces had already been treated with vinyltrimethoxysilane were obtained.

Subsequently, 18 parts of the rutile-type titanium oxide particles whose surfaces had already been treated with vinyltrimethoxysilane, 4.5 parts of N-methoxymethylated nylon (product name: TORESIN EF-30T, manufactured by Nagase ChemteX Corporation), and 1.5 parts of a copolymerized nylon resin (product name: AMILAN (trademark) CM8000, manufactured by Toray Industries, Inc.) were added to a mixed solvent of 90 parts of methanol and 60 parts of 1-butanol to prepare a dispersion liquid. The dispersion liquid was subjected to dispersion treatment for 5 hours with a vertical sand mill through use of glass beads each having a diameter of 1.0 mm to prepare a coating liquid for an undercoat layer.

<Preparation of Coating Liquid for Charge-Generating Layer>

Synthesis Example

In 100 g of a-chloronaphthalene, 5.0 g of o-phthalodinitrile and 2.0 g of titanium tetrachloride were heated and stirred at 200° C. for 3 hours, and were then cooled to 50° C. to precipitate a crystal. The crystal was separated by filtration to provide a paste of dichlorotitanium phthalocyanine. Next, the paste was stirred and washed with 100 mL of N,N-dimethylformamide heated to 100° C., and was then washed repeatedly twice with 100 mL of methanol at 60° C. and separated by filtration. Further, the resultant paste was stirred at 80° C. for 1 hour in 100 mL of deionized water, and was separated by filtration to provide 4.3 g of a blue titanyl phthalocyanine pigment.

Milling Example 0.5 Part of the titanyl phthalocyanine pigment obtained in Synthesis Example, 10 parts of tetrahydrofuran, and 15 parts of glass beads each having a diameter of 0.9 mm were subjected to milling treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 48 hours. At this time, the treatment was performed under such a condition that the discs were rotated 500 times per minute. The glass beads were removed by filtering the liquid thus treated with a filter (product number: N-NO. 125T, pore diameter: 133 μm, manufactured by NBC Meshtec Inc.). 30 Parts of tetrahydrofuran was added to the resultant liquid, and then the mixture was filtered, followed by sufficient washing of the filtration residue on the filter with methanol and water. Then, the washed filtration residue was dried in a vacuum to provide 0.45 part of a titanyl phthalocyanine pigment. The resultant pigment had a strong peak at a Bragg angle 2θ of 27.2°±0.3° in an X-ray diffraction spectrum using a CuKα ray.

12 Parts of the titanyl phthalocyanine pigment obtained in Milling Example, 10 parts of polyvinyl butyral (product name: S-LEC BX-1, manufactured by Sekisui Chemical Co., Ltd.), 158 parts of cyclohexanone, and 402 parts of glass beads each having a diameter of 0.9 mm were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. After the glass beads were removed, 369 parts of cyclohexanone and 527 parts of ethyl acetate were added to the dispersion liquid to prepare a coating liquid for a charge-generating layer.

<Preparation of Coating Liquid for Charge-transporting Layer>

30 Parts of a charge-transporting substance represented by the following formula (A4):

(A4)

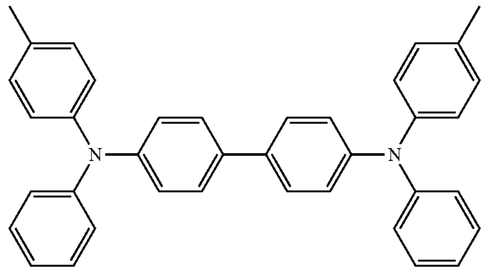

50 parts of a charge-transporting substance represented by the following formula (A5):

(A5)

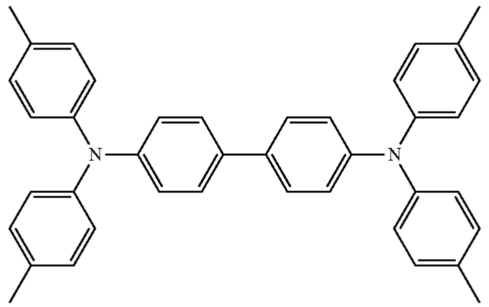

and 100 parts of polycarbonate (product name: IUPILON Z-400, manufactured by Mitsubishi Engineering-Plastics Corporation) were dissolved in a mixed solvent of 210 parts of orthoxylene, 360 parts of methyl benzoate, and 140 parts of dimethoxymethane to prepare a coating liquid for a charge-transporting layer.

<Preparation of Coating Liquid for Protective Layer>

[Preparation of Coating Liquid 1 for Protective Layer]

5 Parts of a monofunctional (meth)acrylic compound represented by the following formula (A6):

(A6)

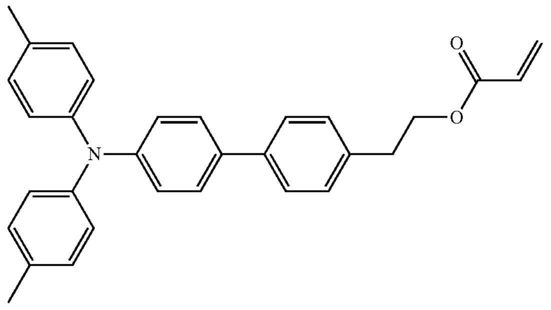

100 parts of a tri- or higher functional (meth)acrylic compound represented by the following formula (A7):

(A7)

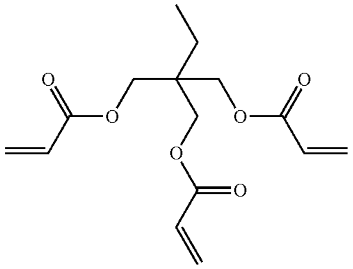

5.3 parts of a photopolymerization initiator (product name: IRGACURE 184, manufactured by Ciba Specialty Chemicals), and 13.2 parts of alumina particles (product name: AA03 (primary particle diameter: 0.3 μm), manufactured by Sumitomo Chemical Company, Limited) were dissolved in 537 parts of tetrahydrofuran. The resultant solution was analyzed through use of chromatography and accurate mass spectrometry. Thus, it was recognized that a diphenylamine compound represented by the following formula (A8):

(A8)

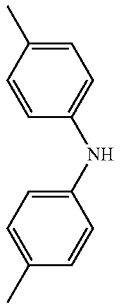

was contained at a mass ratio of 5 ppm with respect to a solid content. The diphenylamine compound was added so that the mass ratio became 500 ppm to prepare a coating liquid 1 for a protective layer having a solid content of 23 mass %.

[Preparation of Coating Liquids 2 to 77 for Protective Layers]

Coating liquids 2 to 77 for protective layers were prepared by changing the structural formula and parts by mass of the monofunctional (meth)acrylic compound, the structural formula and parts by mass of the tri- or higher functional (meth)acrylic compound, the mass ratio after the addition of the diphenylamine compound, and the particle kind and parts by mass of the particles A containing metal atoms as shown in Tables 1 and 2 in the preparation of the coating liquid 1 for a protective layer. The amount of the photopolymerization initiator (product name: IRGACURE 184, manufactured by Ciba Specialty Chemicals) was appropriately adjusted so as to be 5 mass % with respect to the (meth)acrylic compound(s). The amount of the tetrahydrofuran was appropriately adjusted so that the solid content became 23 mass %. In the coating liquids 45, 48, and 74 for protective layers, two kinds of tri- or higher functional (meth)acrylic compounds were used. In the coating liquids 64 to 71 for protective layers, the particles A containing metal atoms were not used. In the coating liquids 72 to 74 for protective layers, the monofunctional (meth)acrylic compound was not used. In the coating liquids 75 to 77 for protective layers, a bifunctional (meth)acrylic compound was used instead of using the monofunctional (meth)acrylic compound.

Structural formulae (A9) to (A33) in Tables 1 and 2 are shown below.

(A9)

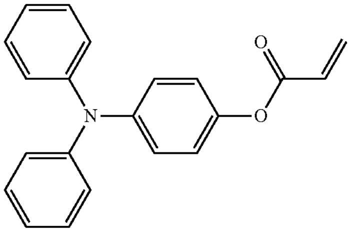

(A10)

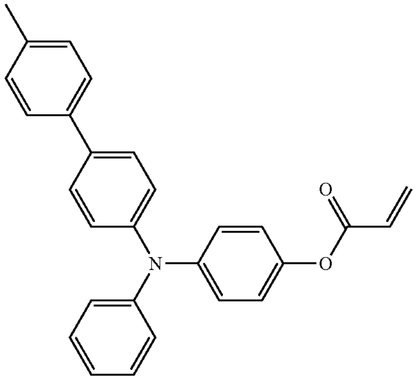

(A11)

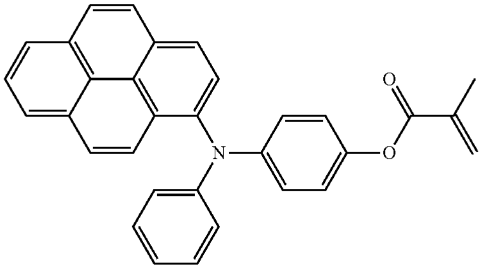

(A12)

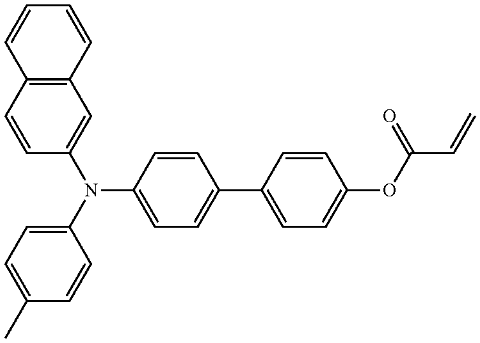

(A13)

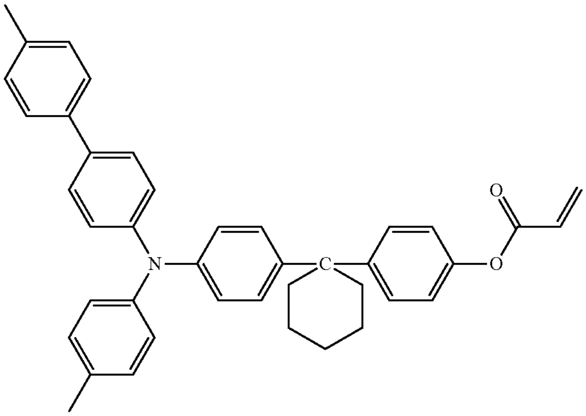

(A14)

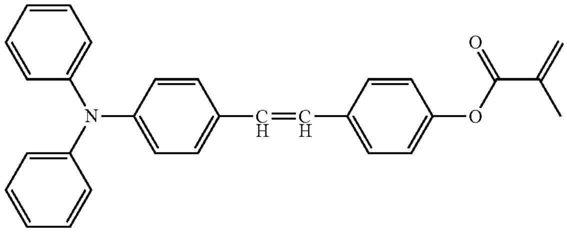

-continued
(A15)
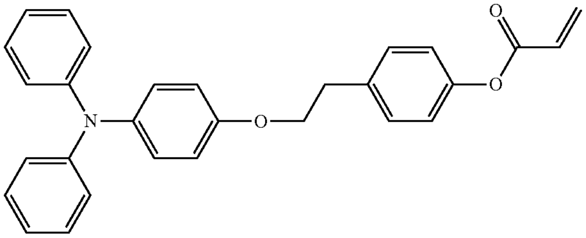
(A16)
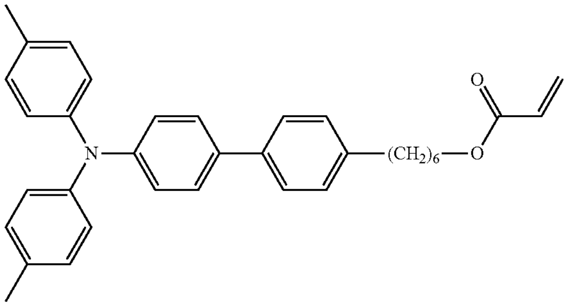
(A17)
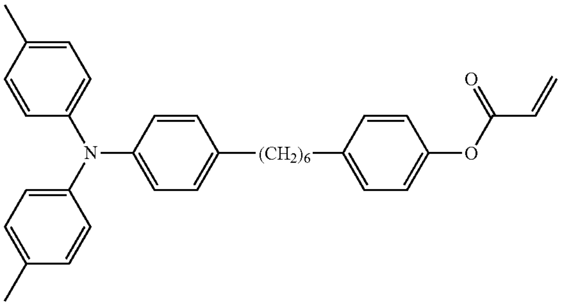
(A18)
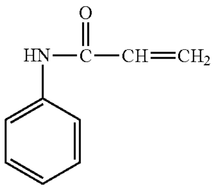
(A19)
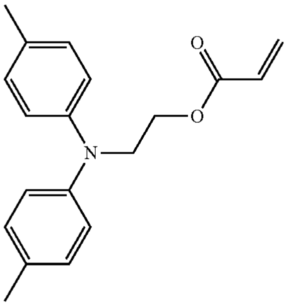
(A20)
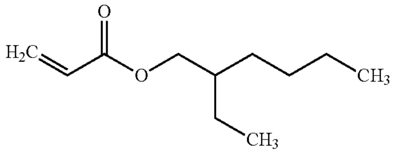
(A21)
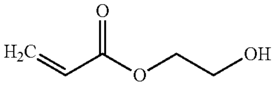
(A22)
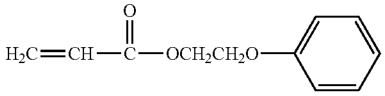
(A23)
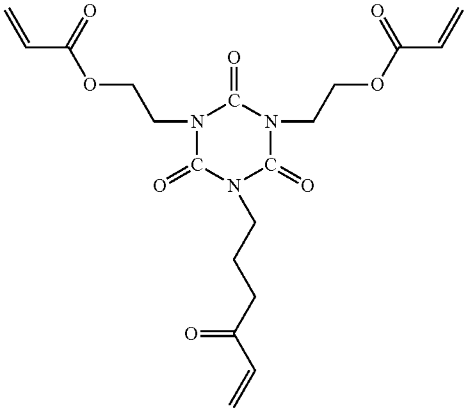

-continued
(A24)
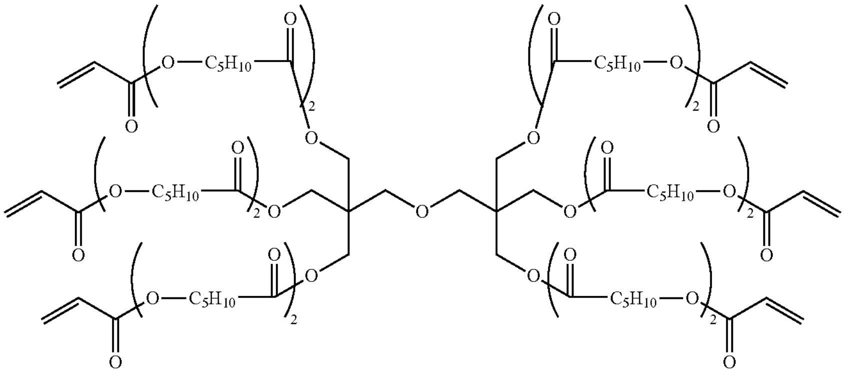
(A25)
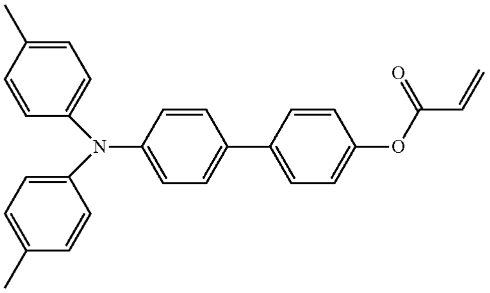
(A26)
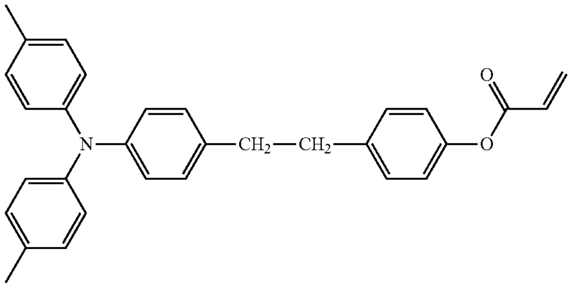
(A27)
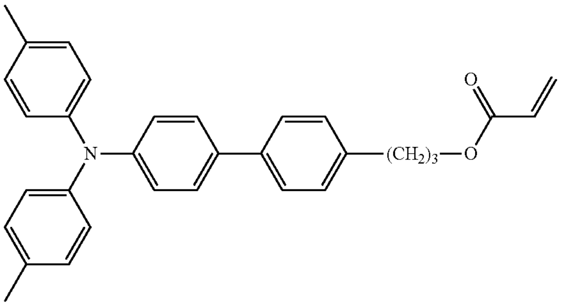
(A28)
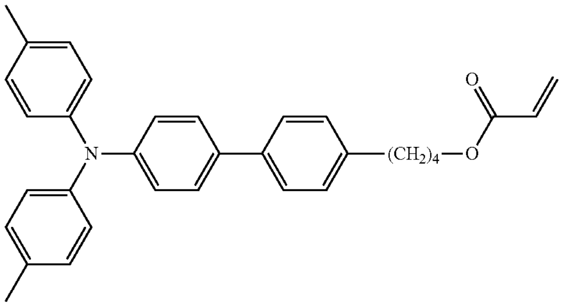
(A29)
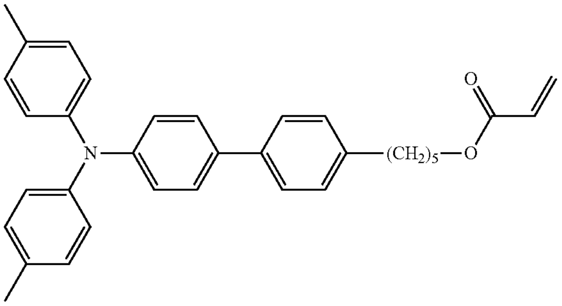
(A30)
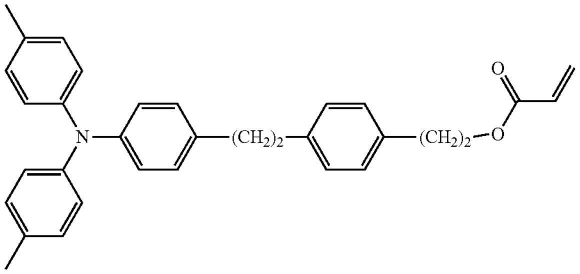
(A31)
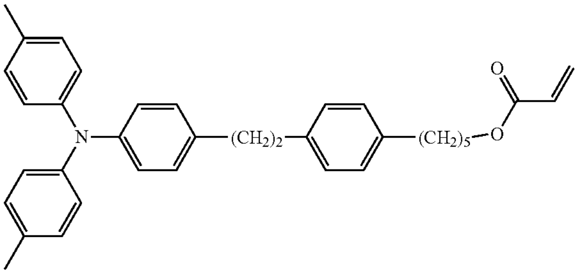

-continued (A32)

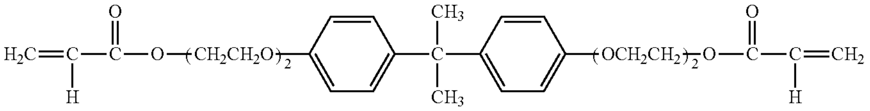

(A33)

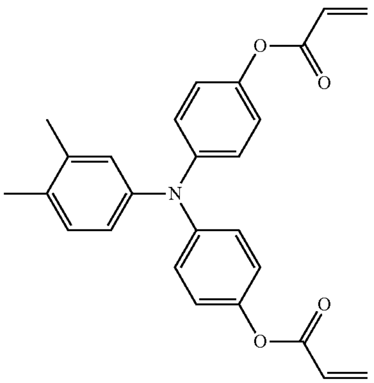

Titanium oxide particles (product name: JR-405, average primary particle diameter: 210 nm, manufactured by Tayca Corporation) were used as the "titanium oxide" in Tables 1 and 2. Tin oxide particles (average primary particle diameter: 20 nm, manufactured by CIK NanoTek Corporation) were used as the "tin oxide". Barium sulfate particles (product name: Passtran PC1 manufactured by Mitsui Mining & Smelting Co., Ltd.) were used as the "barium sulfate".

TABLE 1

| Coating liquid No. for | Monofunctional (meth)acrylic compound | | Tri- or higher functional (meth)acrylic compound-1 | | Tri- or higher functional (meth)acrylic compound-2 | | Mass ratio of diphenylamine | Particles A containing metal atoms | |
|---|---|---|---|---|---|---|---|---|---|
| protective layer | Structural formula | Part(s) by mass | Structural formula | Part(s) by mass | Structural formula | Part(s) by mass | compound/ ppm | Particle kind | Part(s) by mass |
| 1 | (A6) | 5 | (A7) | 100 | — | — | 500 | Alumina | 13.2 |
| 2 | (A6) | 15 | (A7) | 100 | — | — | 500 | Alumina | 14.5 |
| 3 | (A6) | 25 | (A7) | 100 | — | — | 500 | Alumina | 15.8 |
| 4 | (A6) | 50 | (A7) | 100 | — | — | 500 | Alumina | 18.9 |
| 5 | (A6) | 100 | (A7) | 100 | — | — | 500 | Alumina | 25.2 |
| 6 | (A6) | 150 | (A7) | 100 | — | — | 500 | Alumina | 31.5 |
| 7 | (A6) | 300 | (A7) | 100 | — | — | 500 | Alumina | 50.4 |
| 8 | (A6) | 450 | (A7) | 100 | — | — | 500 | Alumina | 69.3 |
| 9 | (A6) | 600 | (A7) | 100 | — | — | 500 | Alumina | 88.2 |
| 10 | (A6) | 900 | (A7) | 100 | — | — | 500 | Alumina | 126 |
| 11 | (A6) | 100 | (A7) | 100 | — | — | 500 | Alumina | 25.2 |
| 12 | (A6) | 100 | (A7) | 100 | — | — | 500 | Alumina | 25.2 |
| 13 | (A6) | 100 | (A7) | 100 | — | — | 500 | Alumina | 25.2 |
| 14 | (A6) | 100 | (A7) | 100 | — | — | 500 | Alumina | 25.2 |
| 15 | (A6) | 100 | (A7) | 100 | — | — | 500 | Alumina | 25.2 |
| 16 | (A6) | 100 | (A7) | 100 | — | — | 500 | Alumina | 25.2 |
| 17 | (A6) | 100 | (A7) | 100 | — | — | 5 | Alumina | 25.2 |
| 18 | (A6) | 100 | (A7) | 100 | — | — | 8 | Alumina | 25.2 |
| 19 | (A6) | 100 | (A7) | 100 | — | — | 12 | Alumina | 25.2 |
| 20 | (A6) | 100 | (A7) | 100 | — | — | 30 | Alumina | 25.2 |
| 21 | (A6) | 100 | (A7) | 100 | — | — | 100 | Alumina | 25.2 |
| 22 | (A6) | 100 | (A7) | 100 | — | — | 300 | Alumina | 25.2 |
| 23 | (A6) | 100 | (A7) | 100 | — | — | 900 | Alumina | 25.2 |
| 24 | (A6) | 100 | (A7) | 100 | — | — | 1,200 | Alumina | 25.2 |
| 25 | (A6) | 100 | (A7) | 100 | — | — | 3,000 | Alumina | 25.2 |
| 26 | (A6) | 100 | (A7) | 100 | — | — | 9,000 | Alumina | 25.2 |
| 27 | (A6) | 100 | (A7) | 100 | — | — | 12,000 | Alumina | 25.2 |
| 28 | (A6) | 100 | (A7) | 100 | — | — | 20,000 | Alumina | 25.2 |
| 29 | (A9) | 100 | (A7) | 100 | — | — | 500 | Alumina | 25.2 |
| 30 | (A10) | 100 | (A7) | 100 | — | — | 500 | Alumina | 25.2 |
| 31 | (A11) | 100 | (A7) | 100 | — | — | 500 | Alumina | 25.2 |
| 32 | (A12) | 100 | (A7) | 100 | — | — | 500 | Alumina | 25.2 |
| 33 | (A13) | 100 | (A7) | 100 | — | — | 500 | Alumina | 25.2 |
| 34 | (A14) | 100 | (A7) | 100 | — | — | 500 | Alumina | 25.2 |
| 35 | (A15) | 100 | (A7) | 100 | — | — | 500 | Alumina | 25.2 |
| 36 | (A16) | 100 | (A7) | 100 | — | — | 500 | Alumina | 25.2 |
| 37 | (A17) | 100 | (A7) | 100 | — | — | 500 | Alumina | 25.2 |

TABLE 1-continued

| Coating liquid No. for protective layer | Monofunctional (meth)acrylic compound Structural formula | Part(s) by mass | Tri- or higher functional (meth)acrylic compound-1 Structural formula | Part(s) by mass | Tri- or higher functional (meth)acrylic compound-2 Structural formula | Part(s) by mass | Mass ratio of diphenylamine compound/ppm | Particles A containing metal atoms Particle kind | Part(s) by mass |
|---|---|---|---|---|---|---|---|---|---|
| 38 | (A18) | 100 | (A7) | 100 | — | — | 500 | Alumina | 25.2 |
| 39 | (A19) | 100 | (A7) | 100 | — | — | 500 | Alumina | 25.2 |
| 40 | (A20) | 100 | (A7) | 100 | — | — | 500 | Alumina | 25.2 |
| 41 | (A21) | 100 | (A7) | 100 | — | — | 500 | Alumina | 25.2 |
| 42 | (A22) | 100 | (A7) | 100 | — | — | 500 | Alumina | 25.2 |

TABLE 2

| Coating liquid No. for protective layer | Monofunctional (meth)acrylic compound Structural formula | Part(s) by mass | Tri- or higher functional (meth)acrylic compound-1 Structural formula | Part(s) by mass | Tri- or higher functional (meth)acrylic compound-2 Structural formula | Part(s) by mass | Mass ratio of diphenylamine compound/ppm | Particles A containing metal atoms Particle kind | Part(s) by mass |
|---|---|---|---|---|---|---|---|---|---|
| 43 | (A6) | 100 | (A23) | 100 | — | — | 500 | Alumina | 25.2 |
| 44 | (A6) | 100 | (A24) | 100 | — | — | 500 | Alumina | 25.2 |
| 45 | (A6) | 100 | (A7) | 50 | (A24) | 50 | 500 | Alumina | 25.2 |
| 46 | (A25) | 100 | (A7) | 100 | — | — | 500 | Alumina | 25.2 |
| 47 | (A25) | 100 | (A24) | 100 | — | — | 500 | Alumina | 25.2 |
| 48 | (A25) | 100 | (A7) | 50 | (A24) | 50 | 500 | Alumina | 25.2 |
| 49 | (A26) | 100 | (A7) | 100 | — | — | 500 | Alumina | 25.2 |
| 50 | (A27) | 100 | (A7) | 100 | — | — | 500 | Alumina | 25.2 |
| 51 | (A28) | 100 | (A7) | 100 | — | — | 500 | Alumina | 25.2 |
| 52 | (A29) | 100 | (A7) | 100 | — | — | 500 | Alumina | 25.2 |
| 53 | (A30) | 100 | (A7) | 100 | — | — | 500 | Alumina | 25.2 |
| 54 | (A31) | 100 | (A7) | 100 | — | — | 500 | Alumina | 25.2 |
| 55 | (A6) | 100 | (A7) | 100 | — | — | 500 | Alumina | 6.3 |
| 56 | (A6) | 100 | (A7) | 100 | — | — | 500 | Alumina | 10.5 |
| 57 | (A6) | 100 | (A7) | 100 | — | — | 500 | Alumina | 16.8 |
| 58 | (A6) | 100 | (A7) | 100 | — | — | 500 | Alumina | 31.5 |
| 59 | (A6) | 100 | (A7) | 100 | — | — | 500 | Alumina | 35.7 |
| 60 | (A6) | 100 | (A7) | 100 | — | — | 500 | Alumina | 42.0 |
| 61 | (A6) | 100 | (A7) | 100 | — | — | 500 | Titanium oxide | 25.2 |
| 62 | (A6) | 100 | (A7) | 100 | — | — | 500 | Tin oxide | 25.2 |
| 63 | (A6) | 100 | (A7) | 100 | — | — | 500 | Barium sulfate | 25.2 |
| 64 | (A6) | 100 | (A7) | 100 | — | — | 500 | — | — |
| 65 | (A6) | 15 | (A7) | 100 | — | — | 500 | — | — |
| 66 | (A6) | 25 | (A7) | 100 | — | — | 500 | — | — |
| 67 | (A6) | 50 | (A7) | 100 | — | — | 500 | — | — |
| 68 | (A6) | 150 | (A7) | 100 | — | — | 500 | — | — |
| 69 | (A6) | 300 | (A7) | 100 | — | — | 500 | — | — |
| 70 | (A6) | 450 | (A7) | 100 | — | — | 500 | — | — |
| 71 | (A6) | 900 | (A7) | 100 | — | — | 500 | — | — |
| 72 | — | — | (A7) | 100 | — | — | 500 | Alumina | 12.6 |
| 73 | — | — | (A24) | 100 | — | — | 500 | Alumina | 12.6 |
| 74 | — | — | (A7) | 50 | (A24) | 50 | 500 | Alumina | 12.6 |

| Coating liquid No. for protective layer | Bifunctional (meth)acrylic compound Structural formula | Part(s) by mass | Tri- or higher functional (meth)acrylic compound-1 Structural formula | Part(s) by mass | Tri- or higher functional (meth)acrylic compound-2 Structural formula | Part(s) by mass | Mass ratio of diphenylamine compound/ppm | Particles A containing metal atoms Particle kind | Part(s) by mass |
|---|---|---|---|---|---|---|---|---|---|
| 75 | (A32) | 100 | (A7) | 100 | — | — | 500 | Alumina | 25.2 |
| 76 | (A32) | 100 | (A24) | 100 | — | — | 500 | Alumina | 25.2 |
| 77 | (A33) | 100 | (A24) | 100 | — | — | 500 | Alumina | 25.2 |

<Production of Electrophotographic Photosensitive Member>

Photosensitive Member Production Example 1

An aluminum cylinder (JIS-A3003, aluminum alloy) having a length of 260.5 mm and a diameter of 30 mm was obtained as a support by a production method including an extruding step and a drawing step.

The coating liquid for an undercoat layer was applied onto the support by dip coating to form a coating film, and the coating film was dried by heating at 100° C. for 10 minutes, to thereby form an undercoat layer having a thickness of 4.0 μm.

Next, the coating liquid for a charge-generating layer was applied onto the undercoat layer by dip coating to form a coating film, and the coating film was dried by heating at 100° C. for 10 minutes, to thereby form a charge-generating layer having a thickness of 0.22 μm.

Next, the coating liquid for a charge-transporting layer was applied onto the charge-generating layer by dip coating to form a coating film, and the coating film was dried by heating at a temperature of 120° C. for 60 minutes, to thereby form a charge-transporting layer having a thickness of 23 μm.

Next, the coating liquid 1 for a protective layer was applied onto the charge-transporting layer by dip coating to form a coating film, and the coating film was dried by heating at a temperature of 40° C. for 3 minutes. After that, the resultant was irradiated with light through use of a metal halide lamp (irradiation intensity: 450 $mW/cm^2$, irradiation time: 50 seconds), and further dried by heating at a temperature of 135° C. for 25 minutes, to thereby form a protective layer having a thickness of 3.8 μm.

The heating treatment of the coating film of each layer was performed with an oven set to each temperature. Thus, a cylindrical (drum-shaped) photosensitive member 1 was produced.

The photosensitive member thus obtained was measured for the content ratio "a" [mass %] of the monofunctional (meth)acrylic compound to the tri- or higher functional (meth)acrylic compound, the elastic deformation rate of the surface, the content ratio of the diphenylamine compound to the surface layer, and the content ratio of the particles A containing metal atoms to the surface layer by the methods described in <Method of identifying Monofunctional (Meth) acrylic Compound and Tri- or higher Functional (Meth) acrylic Compound>, <Measurement of Elastic Deformation Rate>, <Method of identifying Diphenylamine Compound>, and <Method of identifying Particle A containing Metal Atom> above, respectively. The results are shown in Tables 3 and 4.

Photosensitive Member Production Examples 2 to 77

Photosensitive members 2 to 77 were produced in the same manner as in Photosensitive Member Production Example 1 except that the coating liquid 1 for a protective layer was changed to the coating liquids 2 to 77 for protective layers in Photosensitive Member Production Example 1. In addition, in the same manner as in the photosensitive member 1, the photosensitive members were measured for the content ratio "a" [mass %] of the monofunctional (meth)acrylic compound to the tri- or higher functional (meth)acrylic compound, the elastic deformation rate of the surface, the content ratio of the diphenylamine compound to the surface layer, and the content ratio of the particles A containing metal atoms to the surface layer. The results are shown in Tables 3 and 4. In Photosensitive Member Production Examples 11 to 16, the irradiation intensity of the metal halide lamp was appropriately adjusted so as to achieve the elastic deformation rates shown in Tables 3 and 4.

TABLE 3

| Photosensitive member No. | Coating liquid No. for protective layer | a/% | Elastic deformation rate of surface/% | Content mass ratio of diphenylamine compound to surface layer/ppm | Content mass of particles A containing metal atoms with respect to surface layer % |
|---|---|---|---|---|---|
| 1 | 1 | 5% | 48% | 500 | 12% |
| 2 | 2 | 15% | 48% | 500 | 12% |
| 3 | 3 | 25% | 48% | 500 | 12% |
| 4 | 4 | 50% | 48% | 500 | 12% |
| 5 | 5 | 100% | 48% | 500 | 12% |
| 6 | 6 | 150% | 48% | 500 | 12% |
| 7 | 7 | 300% | 48% | 500 | 12% |
| 8 | 8 | 450% | 48% | 500 | 12% |
| 9 | 9 | 600% | 48% | 500 | 12% |
| 10 | 10 | 900% | 48% | 500 | 12% |
| 11 | 11 | 100% | 33% | 500 | 12% |
| 12 | 12 | 100% | 36% | 500 | 12% |
| 13 | 13 | 100% | 39% | 500 | 12% |
| 14 | 14 | 100% | 43% | 500 | 12% |
| 15 | 15 | 100% | 51% | 500 | 12% |
| 16 | 16 | 100% | 54% | 500 | 12% |
| 17 | 17 | 100% | 53% | 5 | 12% |
| 18 | 18 | 100% | 51% | 8 | 12% |
| 19 | 19 | 100% | 49% | 12 | 12% |
| 20 | 20 | 100% | 48% | 30 | 12% |
| 21 | 21 | 100% | 46% | 100 | 12% |
| 22 | 22 | 100% | 43% | 300 | 12% |
| 23 | 23 | 100% | 40% | 900 | 12% |
| 24 | 24 | 100% | 37% | 1,200 | 12% |
| 25 | 25 | 100% | 34% | 3,000 | 12% |
| 26 | 26 | 100% | 32% | 9,000 | 12% |
| 27 | 27 | 100% | 32% | 12,000 | 12% |
| 28 | 28 | 100% | 31% | 20,000 | 12% |
| 29 | 29 | 100% | 49% | 500 | 12% |
| 30 | 30 | 100% | 48% | 500 | 12% |
| 31 | 31 | 100% | 48% | 500 | 12% |
| 32 | 32 | 100% | 48% | 500 | 12% |
| 33 | 33 | 100% | 47% | 500 | 12% |
| 34 | 34 | 100% | 47% | 500 | 12% |
| 35 | 35 | 100% | 47% | 500 | 12% |
| 36 | 36 | 100% | 46% | 500 | 12% |
| 37 | 37 | 100% | 46% | 500 | 12% |
| 38 | 38 | 100% | 48% | 500 | 12% |
| 39 | 39 | 100% | 48% | 500 | 12% |
| 40 | 40 | 100% | 49% | 500 | 12% |
| 41 | 41 | 100% | 49% | 500 | 12% |
| 42 | 42 | 100% | 48% | 500 | 12% |

TABLE 4

| Photosensitive member No. | Coating liquid No. for protective layer | a/% | Elastic deformation rate of surface/% | Content mass ratio of diphenylamine compound to surface layer/ppm | Content mass of particles A containing metal atoms with respect to surface layer % |
|---|---|---|---|---|---|
| 43 | 43 | 100% | 48% | 500 | 12% |
| 44 | 44 | 100% | 49% | 500 | 12% |
| 45 | 45 | 100% | 49% | 500 | 12% |
| 46 | 46 | 100% | 48% | 500 | 12% |
| 47 | 47 | 100% | 49% | 500 | 12% |
| 48 | 48 | 100% | 49% | 500 | 12% |
| 49 | 49 | 100% | 48% | 500 | 12% |

TABLE 4-continued

| Photo-sensitive member No. | Coating liquid No. for protective layer | a/% | Elastic deforma-tion rate of surface/% | Content mass ratio of diphenyl-amine compound to surface layer/ppm | Content mass of particles A containing metal atoms with respect to surface layer % |
|---|---|---|---|---|---|
| 50 | 50 | 100% | 48% | 500 | 12% |
| 51 | 51 | 100% | 47% | 500 | 12% |
| 52 | 52 | 100% | 47% | 500 | 12% |
| 53 | 53 | 100% | 48% | 500 | 12% |
| 54 | 54 | 100% | 45% | 500 | 12% |
| 55 | 55 | 100% | 48% | 500 | 3% |
| 56 | 56 | 100% | 48% | 500 | 5% |
| 57 | 57 | 100% | 48% | 500 | 8% |
| 58 | 58 | 100% | 48% | 500 | 15% |
| 59 | 59 | 100% | 48% | 500 | 17% |
| 60 | 60 | 100% | 48% | 500 | 20% |
| 61 | 61 | 100% | 48% | 500 | 12% |
| 62 | 62 | 100% | 48% | 500 | 12% |
| 63 | 63 | 100% | 48% | 500 | 12% |
| 64 | 64 | 100% | 48% | 500 | 0% |
| 65 | 65 | 15% | 48% | 500 | 0% |
| 66 | 66 | 25% | 48% | 500 | 0% |
| 67 | 67 | 50% | 48% | 500 | 0% |
| 68 | 68 | 150% | 48% | 500 | 0% |
| 69 | 69 | 300% | 48% | 500 | 0% |
| 70 | 70 | 450% | 48% | 500 | 0% |
| 71 | 71 | 900% | 48% | 500 | 0% |
| 72 | 72 | 0% | 51% | 500 | 12% |
| 73 | 73 | 0% | 52% | 500 | 12% |
| 74 | 74 | 0% | 52% | 500 | 12% |
| 75 | 75 | 0% | 51% | 500 | 12% |
| 76 | 76 | 0% | 52% | 500 | 12% |
| 77 | 77 | 0% | 52% | 500 | 12% |

<Production of Toner>

Preparation Example of Resin Particle-dispersed Liquid

Styrene 76.0 parts
Butyl acrylate 22.7 parts
Acrylic acid 1.3 parts
n-Lauryl mercaptan 3.2 parts The above-mentioned materials were loaded into a vessel and mixed by stirring. An aqueous solution of 1.5 parts of Neogen RK (manufactured by DKS Co. Ltd.) in 150.0 parts of ion-exchanged water was added to the solution and dispersed therein.

Further, under gentle stirring for 10 minutes, an aqueous solution of 0.3 part of potassium persulfate in 10.0 parts of ion-exchanged water was added to the resultant. After purging with nitrogen, emulsion polymerization was performed at 70° C. for 6 hours. After the completion of the polymerization, the reaction liquid was cooled to room temperature, and ion-exchanged water was added to the resultant to provide a resin particle-dispersed liquid having a solid content concentration of 12.5 mass % and a glass transition temperature of 58° C. The particle size distribution of resin particles contained in the resin particle-dispersed liquid was measured with a particle size measuring device (LA-920, manufactured by Horiba, Ltd.). As a result, the number-average particle diameter of the contained resin particles was found to be 0.2 μm. In addition, coarse particles each having a particle diameter of more than 1 μm were not observed.

Preparation Example of Release Agent-dispersed Liquid 1

100.0 Parts of behenyl behenate (melting point: 72.1° C.) and 15.0 parts of Neogen RK were mixed with 385.0 parts of ion-exchanged water and dispersed therein for about 1 hour with a wet jet mill JN100 (manufactured by Jokoh Co., Ltd.). Thus, a release agent-dispersed liquid 1 was obtained. The wax concentration of the release agent-dispersed liquid 1 was 20.0 mass %. The particle size distribution of release agent particles contained in the release agent-dispersed liquid 1 was measured with a particle size measuring device (LA-920, manufactured by Horiba, Ltd.). As a result, the number-average particle diameter of the contained release agent particles was found to be 0.35 μm. In addition, coarse particles each having a particle diameter of more than 1 μm were not observed.

Preparation Example of Release Agent-Dispersed Liquid 2

100.0 Parts of a hydrocarbon-based wax HNP-9 (manufactured by Nippon Seiro Co., Ltd., melting point: 75.5° C.) and 15 parts of Neogen RK were mixed with 385.0 parts of ion-exchanged water and dispersed therein for about 1 hour with a wet jet mill JN100 (manufactured by Jokoh Co., Ltd.). Thus, a release agent-dispersed liquid 2 was obtained. The wax concentration of the release agent-dispersed liquid 2 was 20.0 mass %. The particle size distribution of release agent particles contained in the release agent-dispersed liquid 2 was measured with a particle diameter measuring device (LA-920, manufactured by Horiba, Ltd.). As a result, the number-average particle diameter of the contained release agent particles was found to be 0.35 μm. In addition, coarse particles each having a particle diameter of more than 1 μm were not observed.

Preparation Example of Colorant-dispersed Liquid 50.0 Parts of copper phthalocyanine (Pigment Blue 15:3) serving as a colorant and 5.0 parts of Neogen RK were mixed with 200.0 parts of ion-exchanged water and dispersed therein for about 1 hour with a wet jet mill JN100. Thus, a colorant-dispersed liquid 1 was obtained. The solid content concentration of the colorant-dispersed liquid 1 was 20.0 mass %. The particle size distribution of colorant particles contained in the colorant-dispersed liquid 1 was measured with a particle size measuring device (LA-920, manufactured by Horiba, Ltd.). As a result, the number-average particle diameter of the contained colorant particles was found to be 0.20 μm. In addition, coarse particles each having a particle diameter of more than 1 μm were not observed.

(Method of Producing Toner Particles)

Resin particle-dispersed liquid: 265.0 parts
Release agent-dispersed liquid 1:10.0 parts
Release agent-dispersed liquid 2:8.0 parts
Colorant-dispersed liquid: 8.0 parts As a core forming step, the above-mentioned respective materials were loaded into a round stainless-steel flask and mixed. Subsequently, the materials were dispersed at 5,000 r/min for 10 minutes through use of a homogenizer (ULTRA-TURRAX T50, manufactured by IKA Japan K.K.). The temperature in the vessel was adjusted to 30° C. under stirring, and the pH was adjusted to 8.0 by adding a 1 mol/L sodium hydroxide aqueous solution.

An aqueous solution in which 0.25 part of aluminum chloride was dissolved in 10.0 parts of ion-exchanged water was added as a flocculant to the resultant over 10 minutes under stirring at 30° C. The resultant was left to stand for 3 minutes, and its temperature was started to be increased. The temperature was increased to 60° C. so that the generation of aggregated particles (formation of a core) was performed. The median diameter based on a volume of the formed aggregated particles was conveniently recognized through use of "Coulter Counter Multisizer 3" (trademark, manufactured by Beckman Coulter, Inc.). At the time point when the median diameter based on a volume became 7.0 μm, a 1 mol/L sodium hydroxide aqueous solution was added to the resultant to adjust the pH to 9.0, and then, the temperature was increased to 95° C. Thus, the aggregated particles were spheroidized.

(Preparation of Hydrotalcite Particles 1)

A mixed aqueous solution (solution A) of 1.03 mol/L magnesium chloride and 0.239 mol/L aluminum sulfate, a 0.753 mol/L sodium carbonate aqueous solution (solution B), and a 3.39 mol/L sodium hydroxide aqueous solution (solution C) were prepared.

Then, the solution A, the solution B, and the solution C were injected into a reaction vessel with a metering pump at such a flow rate that the volume ratio "solution A: solution B" became 4.5:1, and the pH value of the reaction solution was kept in a range of from 9.3 to 9.6 with the solution C. The reaction was performed at a reaction temperature of 40° C. to generate precipitates. After filtration and washing, the resultant was subjected to re-emulsification in ion-exchanged water to provide a hydrotalcite slurry as a raw material. The concentration of hydrotalcite in the resultant hydrotalcite slurry was 5.6 mass %. The resultant hydrotalcite slurry was dried in a vacuum overnight at 40° C. NaF was dissolved in ion-exchanged water so that the concentration became 100 mg/L, and the resultant was adjusted to pH 7.0 with 1 mol/L HCl or 1 mol/L NaOH. Then, the dried hydrotalcite was added to the prepared solution so as to achieve 0.1% (w/v %). Constant-speed stirring was performed with a magnetic stirrer for 48 hours to the degree that the hydrotalcite was not settled out. After that, the resultant was filtered through a membrane filter having a pore diameter of 0.5 μm and washed with ion-exchanged water. The resultant hydrotalcite was dried in a vacuum overnight at 40° C. and then subjected to shredding treatment.

(Preparation of Hydrotalcite Particles 2 to 31)

(Hydrotalcite particles 2 to 31) were obtained in the same manner as in the production example of the (hydrotalcite particles 1) except that the volume ratio "solution A: solution B" and the concentration of the NaF aqueous solution were conveniently adjusted.

(Hydrotalcite Particles 32)

A mixed aqueous solution (solution A) of 1.03 mol/L magnesium chloride and 0.239 mol/L aluminum sulfate, a 0.753 mol/L sodium carbonate aqueous solution (solution B), and a 3.39 mol/L sodium hydroxide aqueous solution (solution C) were prepared.

Then, the solution A, the solution B, and the solution C were injected into a reaction vessel with a metering pump at such a flow rate that the volume ratio "solution A: solution B" became 4.5:1, and the pH value of the reaction solution was kept in a range of from 9.3 to 9.6 with the solution C. The reaction was performed at a reaction temperature of 40° C. to generate precipitates. After filtration and washing, the resultant was subjected to re-emulsification in ion-exchanged water to provide a hydrotalcite slurry as a raw material. The concentration of hydrotalcite in the resultant hydrotalcite slurry was 5.6 mass %. The resultant hydrotalcite slurry was kept at 95° C., and 5 parts by mass of fluorosilicone oil was added to the hydrotalcite slurry with respect to 95 parts by mass of the solid content, to thereby subject the hydrotalcite slurry to surface treatment. Then, the resultant was filtered and washed with water. Subsequently, the resultant was dried at 100° C. for 24 hours and shredded with an atomizer mill (manufactured by Dalton Corporation). Thus, (hydrotalcite particles 32) were obtained.

(Preparation of Hydrotalcite Particles 33)

(Hydrotalcite particles 33) were obtained in the same manner as in the production example of the (hydrotalcite particles 1) except that ion-exchanged water was used instead of the NaF aqueous solution in the production example of the (hydrotalcite particles 1).

<Production of Toner>

Toner Production Example 1

0.2 Part of the hydrotalcite particles 1 and 1.5 parts of silica particles (product name: RX200, primary average particle diameter: 12 nm, HMDS treatment, manufactured by Nippon Aerosil Co., Ltd.) were externally added to 98.3 parts of the toner particles obtained in the foregoing by FM10C (manufactured by Nippon Coke & Engineering Co., Ltd.) and mixed therewith. Conditions for the external addition were as follows: an AO blade was used as a lower blade; the distance from the wall of a deflector was set to 20 mm; the loading amount of the toner particles was 2.0 kg; the number of revolutions was 66.6 $s^{-1}$; the external addition time was 10 minutes; and cooling water was set to a temperature of 20° C. and a flow rate of 10 L/min. After that, the resultant was sieved with a mesh having an aperture of 200 μm to provide a toner 1.

Toner Production Examples 2 to 41

(Toners 2 to 41) were each produced in the same manner as in Toner Production Example 1 except that the hydrotalcite particles 1 were changed as shown in Table 5, and the amount of the hydrotalcite particles was appropriately adjusted so that the content ratio "b" [mass %] of the hydrotalcite particles to the toner became the value shown in Table 5 in the production method of Toner Production Example 1. However, the hydrotalcite particles were not used in Toner Production Example 41.

Regarding the produced toners 1 to 41, whether or not fluorine was contained in the hydrotalcite particles contained in the toner was determined by the methods shown in <Method of measuring Each Element Ratio of Polyvalent Metal Element and Hydrotalcite Particle in Toner Particle> and (Method of analyzing Fluorine contained in Hydrotalcite Particle). As a result, regarding the toners 1 to 39, fluorine was contained in the hydrotalcite particles contained in the toner.

In addition, regarding the toners 1 to 39, whether or not fluorine was present inside the hydrotalcite particles was determined by the method shown in (Method of analyzing Fluorine and Aluminum inside Hydrotalcite Particle). As a result, regarding the toners 1 to 31, fluorine was present inside the hydrotalcite particles contained in the toner.

Regarding the produced toners 1 to 41, the content ratio of the hydrotalcite particles to the toner, the element ratio (atomic number concentration ratio) Mg/Al of magnesium to aluminum, and the element ratio (atomic number concentration ratio) F/Al of fluorine to aluminum were measured by the methods shown in <Method of measuring Content Ratio "b" [mass %] of Hydrotalcite Particle to Toner>, (Method of calculating Element Ratio (Atomic Number Concentration Ratio) Mg/Al of Magnesium to Aluminum), and (Method of calculating Element Ratio (Atomic Number Concentration Ratio) F/Al of Fluorine to Aluminum) described above. The results are shown in Table 5.

TABLE 5

| Toner No. | Hydrotalcite particles No. | Content mass % of hydrotalcite particles with respect to toner: q | Mg/Al | F/Al |
|---|---|---|---|---|
| 1 | 1 | 0.200% | 2.2 | 0.12 |
| 2 | 2 | 0.005% | 2.2 | 0.12 |
| 3 | 3 | 0.008% | 2.2 | 0.12 |
| 4 | 4 | 0.011% | 2.2 | 0.12 |
| 5 | 5 | 0.015% | 2.2 | 0.12 |
| 6 | 6 | 0.020% | 2.2 | 0.12 |
| 7 | 7 | 0.030% | 2.2 | 0.12 |
| 8 | 8 | 0.050% | 2.2 | 0.12 |
| 9 | 9 | 0.100% | 2.2 | 0.12 |
| 10 | 10 | 0.300% | 2.2 | 0.12 |
| 11 | 11 | 0.500% | 2.2 | 0.12 |
| 12 | 12 | 0.800% | 2.2 | 0.12 |
| 13 | 13 | 1.100% | 2.2 | 0.12 |
| 14 | 14 | 1.700% | 2.2 | 0.12 |
| 15 | 15 | 2.300% | 2.2 | 0.12 |
| 16 | 16 | 2.900% | 2.2 | 0.12 |
| 17 | 17 | 3.500% | 2.2 | 0.12 |
| 18 | 18 | 5.000% | 2.2 | 0.12 |
| 19 | 19 | 0.200% | 1.6 | 0.12 |
| 20 | 20 | 0.200% | 1.8 | 0.12 |
| 21 | 21 | 0.200% | 2.1 | 0.12 |
| 22 | 22 | 0.200% | 3 | 0.12 |
| 23 | 23 | 0.200% | 3.8 | 0.12 |
| 24 | 24 | 0.200% | 2.2 | 0.01 |
| 25 | 25 | 0.200% | 2.2 | 0.02 |
| 26 | 26 | 0.200% | 2.2 | 0.04 |
| 27 | 27 | 0.200% | 2.2 | 0.11 |
| 28 | 28 | 0.200% | 2.2 | 0.32 |
| 29 | 29 | 0.200% | 2.2 | 0.36 |
| 30 | 30 | 0.200% | 2.2 | 0.6 |
| 31 | 31 | 0.200% | 2.2 | 0.74 |
| 32 | 32 | 0.200% | 2.2 | 0.12 |
| 33 | 32 | 0.008% | 2.2 | 0.12 |
| 34 | 32 | 0.020% | 2.2 | 0.12 |
| 35 | 32 | 0.030% | 2.2 | 0.12 |
| 36 | 32 | 0.800% | 2.2 | 0.12 |
| 37 | 32 | 1.100% | 2.2 | 0.12 |
| 38 | 32 | 2.900% | 2.2 | 0.12 |
| 39 | 32 | 3.500% | 2.2 | 0.12 |
| 40 | 33 | 0.200% | 2.2 | 0 |
| 41 | — | 0.000% | — | — |

[Evaluation]

Examples 1 to 124 and Comparative Examples 1 to 10 were evaluated through use of Photosensitive Member Production Examples 1 to 77 and Toner Production Examples 1 to 41 above. The evaluation was performed as described below. The results are shown in Tables 6 to 8.

<Evaluation Apparatus>

A laser beam printer manufactured by Hewlett-Packard Company (product name: Laser Jet Enterprise M609dn) was prepared as an electrophotographic apparatus for an evaluation. The printer was reconstructed so as to be capable of regulating and measuring a process speed, a voltage to be applied to its charging roller, an image exposure amount, and a transfer voltage. In addition, the printer was reconstructed so as to be capable of measuring the drive current amount of a rotary motor of a photosensitive member and measuring an increase ratio of driving torque.

When an image was output, each of the photosensitive members of Photosensitive Member Production Examples 1 to 77 and the toners of Toner Production Examples 1 to 41 were mounted on the process cartridge of the laser beam printer, and a test chart with a print percentage of 5% was output as a monochromatic image.

<Evaluation of Fluctuation in Driving Torque by Endurance>

A charging potential and an exposure potential were set to −500 V and −170 V, respectively, and an average value of driving torques of the photosensitive member on initial 100 sheets was measured under a normal-temperature and normal-humidity environment (temperature: 23.5° C., relative humidity: 50% RH). Next, while the environment of the evaluation apparatus was continuously changed from a low-temperature and low-humidity environment (temperature: 15° C., relative humidity: 10% RH) to a high-temperature and high-humidity environment (temperature: 32.5° C., relative humidity: 80% RH) with 10,000-sheet passing cycles, the charging potential was also continuously changed from −400 V to −600 V with 5,000-sheet passing cycles, and the transfer potential was also continuously changed from +200 V to +400 V with 250-sheet passing cycles, to thereby perform a 100,000-sheet passing endurance test. The driving torques of the photosensitive member on the last 100 sheets were measured under a normal-temperature and normal-humidity environment (temperature: 23.5° C., relative humidity: 50% RH), and an average value thereof was measured. The ratio of the last driving torque to the initial driving torque was adopted as the evaluation value of fluctuation in driving torque by endurance.

<Evaluation of Fluctuation in Potential by Endurance>

The value of an exposure potential after endurance was adopted as the evaluation value of fluctuation in potential by endurance.

TABLE 6

| Example No. | Photo-sensitive member No. | Toner No. | Change in torque by endurance/ % | Fluctuation in potential/ V |
|---|---|---|---|---|
| 1 | 1 | 1 | 142 | 176 |
| 2 | 2 | 1 | 144 | 177 |
| 3 | 3 | 1 | 100 | 172 |
| 4 | 4 | 1 | 110 | 178 |
| 5 | 5 | 1 | 102 | 172 |
| 6 | 6 | 1 | 100 | 176 |
| 7 | 7 | 1 | 109 | 175 |
| 8 | 8 | 1 | 107 | 177 |
| 9 | 9 | 1 | 103 | 173 |
| 10 | 10 | 1 | 144 | 174 |
| 11 | 11 | 1 | 113 | 173 |
| 12 | 12 | 1 | 100 | 174 |
| 13 | 13 | 1 | 107 | 171 |
| 14 | 14 | 1 | 103 | 175 |
| 15 | 15 | 1 | 108 | 177 |
| 16 | 16 | 1 | 111 | 177 |
| 17 | 5 | 2 | 146 | 172 |
| 18 | 5 | 3 | 147 | 174 |
| 19 | 5 | 4 | 149 | 178 |
| 20 | 5 | 5 | 150 | 179 |
| 21 | 5 | 6 | 145 | 175 |
| 22 | 5 | 7 | 101 | 179 |
| 23 | 5 | 8 | 105 | 177 |
| 24 | 5 | 9 | 109 | 176 |
| 25 | 5 | 10 | 109 | 174 |
| 26 | 5 | 11 | 109 | 179 |
| 27 | 5 | 12 | 105 | 173 |
| 28 | 5 | 13 | 147 | 176 |
| 29 | 5 | 14 | 140 | 180 |
| 30 | 5 | 15 | 143 | 177 |
| 31 | 5 | 16 | 148 | 171 |
| 32 | 5 | 17 | 143 | 178 |
| 33 | 5 | 18 | 142 | 173 |
| 34 | 5 | 19 | 106 | 174 |
| 35 | 5 | 20 | 100 | 180 |
| 36 | 5 | 21 | 100 | 179 |

TABLE 6-continued

| Example No. | Photo-sensitive member No. | Toner No. | Change in torque by endurance/ % | Fluctuation in potential/ V |
|---|---|---|---|---|
| 37 | 5 | 22 | 109 | 176 |
| 38 | 5 | 23 | 101 | 175 |
| 39 | 5 | 24 | 107 | 177 |
| 40 | 5 | 25 | 107 | 172 |
| 41 | 5 | 26 | 107 | 170 |
| 42 | 5 | 27 | 105 | 173 |
| 43 | 5 | 28 | 110 | 171 |
| 44 | 5 | 29 | 105 | 175 |
| 45 | 5 | 30 | 102 | 176 |
| 46 | 5 | 31 | 112 | 173 |
| 47 | 5 | 32 | 110 | 179 |

TABLE 7

| Example No. | Photo-sensitive member No. | Toner No. | Change in torque by endurance/ % | Fluctuation in potential/ V |
|---|---|---|---|---|
| 48 | 2 | 32 | 146 | 173 |
| 49 | 3 | 32 | 106 | 178 |
| 50 | 4 | 32 | 110 | 179 |
| 51 | 6 | 32 | 112 | 175 |
| 52 | 7 | 32 | 108 | 172 |
| 53 | 8 | 32 | 104 | 179 |
| 54 | 10 | 32 | 153 | 177 |
| 55 | 5 | 33 | 146 | 178 |
| 56 | 5 | 34 | 148 | 174 |
| 57 | 5 | 35 | 104 | 173 |
| 58 | 5 | 36 | 109 | 177 |
| 59 | 5 | 37 | 153 | 177 |
| 60 | 5 | 38 | 145 | 177 |
| 61 | 5 | 39 | 153 | 178 |
| 62 | 17 | 1 | 107 | 175 |
| 63 | 18 | 1 | 107 | 170 |
| 64 | 19 | 1 | 106 | 173 |
| 65 | 20 | 1 | 108 | 173 |
| 66 | 21 | 1 | 110 | 176 |
| 67 | 22 | 1 | 102 | 178 |
| 68 | 23 | 1 | 109 | 175 |
| 69 | 24 | 1 | 104 | 174 |
| 70 | 25 | 1 | 111 | 170 |
| 71 | 26 | 1 | 113 | 174 |
| 72 | 27 | 1 | 108 | 176 |
| 73 | 28 | 1 | 113 | 177 |
| 74 | 29 | 1 | 107 | 232 |
| 75 | 30 | 1 | 105 | 235 |
| 76 | 31 | 1 | 106 | 236 |
| 77 | 32 | 1 | 109 | 229 |
| 78 | 33 | 1 | 105 | 230 |
| 79 | 34 | 1 | 103 | 229 |
| 80 | 35 | 1 | 108 | 234 |
| 81 | 36 | 1 | 102 | 231 |
| 82 | 37 | 1 | 100 | 233 |
| 83 | 38 | 1 | 107 | 293 |
| 84 | 39 | 1 | 107 | 289 |
| 85 | 40 | 1 | 102 | 340 |
| 86 | 41 | 1 | 109 | 342 |
| 87 | 42 | 1 | 107 | 342 |
| 88 | 43 | 1 | 109 | 170 |
| 89 | 44 | 1 | 110 | 172 |
| 90 | 45 | 1 | 101 | 179 |
| 91 | 46 | 1 | 109 | 176 |
| 92 | 47 | 1 | 102 | 175 |
| 93 | 48 | 1 | 105 | 177 |
| 94 | 49 | 1 | 103 | 179 |

TABLE 8

| | Photo-sensitive member No. | Toner No. | Change in torque by endurance/ % | Fluctuation in potential/ V |
|---|---|---|---|---|
| Example No. | | | | |
| 95 | 50 | 1 | 105 | 173 |
| 96 | 51 | 1 | 101 | 174 |
| 97 | 52 | 1 | 102 | 173 |
| 98 | 53 | 1 | 104 | 174 |
| 99 | 54 | 1 | 107 | 171 |
| 100 | 55 | 1 | 113 | 174 |
| 101 | 56 | 1 | 106 | 176 |
| 102 | 57 | 1 | 106 | 179 |
| 103 | 58 | 1 | 105 | 179 |
| 104 | 59 | 1 | 107 | 179 |
| 105 | 60 | 1 | 112 | 176 |
| 106 | 61 | 1 | 105 | 172 |
| 107 | 62 | 1 | 109 | 178 |
| 108 | 63 | 1 | 114 | 179 |
| 109 | 64 | 1 | 115 | 174 |
| 110 | 64 | 32 | 118 | 178 |
| 111 | 65 | 32 | 162 | 179 |
| 112 | 66 | 32 | 119 | 178 |
| 113 | 67 | 32 | 122 | 172 |
| 114 | 68 | 32 | 122 | 172 |
| 115 | 69 | 32 | 125 | 174 |
| 116 | 70 | 32 | 123 | 178 |
| 117 | 71 | 32 | 160 | 172 |
| 118 | 64 | 33 | 166 | 179 |
| 119 | 64 | 34 | 165 | 174 |
| 120 | 64 | 35 | 121 | 171 |
| 121 | 64 | 36 | 121 | 179 |
| 122 | 64 | 37 | 162 | 172 |
| 123 | 64 | 38 | 159 | 172 |
| 124 | 64 | 39 | 164 | 171 |
| Comparative Example No. | | | | |
| 1 | 72 | 1 | 198 | 344 |
| 2 | 73 | 1 | 202 | 344 |
| 3 | 74 | 1 | 194 | 345 |
| 4 | 75 | 1 | 200 | 346 |
| 5 | 76 | 1 | 200 | 344 |
| 6 | 77 | 1 | 194 | 230 |
| 7 | 5 | 40 | 199 | 176 |
| 8 | 5 | 41 | 204 | 176 |
| 9 | 72 | 40 | 206 | 347 |
| 10 | 72 | 41 | 203 | 347 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-039604, filed Mar. 14, 2022, which is hereby incorporated by reference herein in its entirety.

What is claimed is:

1. A process cartridge configured to be removably mounted onto a main body of an electrophotographic apparatus, the process cartridge comprising:

an electrophotographic photosensitive member;

a toner; and a developing member configured to supply the toner to the electrophotographic photosensitive member;

the electrophotographic photosensitive member having a surface layer that is a polymerized film of a composition containing (i) at least one kind of monofunctional (meth)acrylic compound selected from the group consisting of a monofunctional (meth)acrylic monomer and a monofunctional (meth)acrylic oligomer, and (ii)

at least one kind of tri- or higher functional (meth) acrylic compound selected from the group consisting of a tri- or higher functional (meth)acrylic monomer and a tri- or higher functional (meth)acrylic oligomer;

the surface layer comprising a diphenylamine compound represented by formula (A3)

(A3)

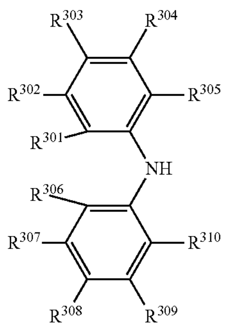

where $R^{301}$ to $R^{310}$ independently represent a hydrogen atom, a methyl group or an ethyl group, wherein a content ratio of the diphenylamine compound in the surface layer is 0.001 to 1.0 mass % with respect to a total mass of the surface layer, the toner contains a toner particle and a hydrotalcite particle as an external additive, and the hydrotalcite particle contains fluorine in filter fitting analysis of STEM-EDS analysis.

2. The process cartridge according to claim 1, wherein a is 20 to 500 mass % when “a” is a content ratio of the monofunctional (meth)acrylic compound to the tri- or higher functional (meth)acrylic compound in the composition.

3. The process cartridge according to claim 2, wherein the surface layer has an elastic deformation rate of 35 to 50%.

4. The process cartridge according to claim 1, wherein b is 0.010 to 3.000 mass % when “b” is a content ratio of the hydrotalcite particle to the toner.

5. The process cartridge according to claim 1, wherein the hydrotalcite particle contains magnesium and aluminum in the filter fitting analysis of the STEM-EDS analysis, and in the filter fitting analysis of the STEM-EDS analysis an element ratio (atomic number concentration ratio) of the magnesium to the aluminum is 1.5 to 4.0.

6. The process cartridge according to claim 5, wherein in the filter fitting analysis of the STEM-EDS analysis an element ratio (atomic number concentration ratio) of the fluorine to the aluminum in the hydrotalcite particle is 0.03 to 0.70.

7. The process cartridge according to claim 1, wherein the fluorine is present inside the hydrotalcite particle in line analysis of the STEM-EDS analysis.

8. The process cartridge according to claim 1, wherein 100≤a/b≤4,000 when “a” is a content ratio of the monofunctional (meth)acrylic compound to the tri- or higher functional (meth)acrylic compound in the composition, and “b” is a content ratio of the hydrotalcite particle to the toner in the toner.

9. The process cartridge according to claim 1, wherein the monofunctional (meth)acrylic compound includes a charge-transporting site.

10. The process cartridge according to claim 9, wherein the charge-transporting site includes a triarylamine site.

11. The process cartridge according to claim 10, wherein the monofunctional (meth)acrylic compound is represented by one of formulae (A1) or (A2)

(A1)

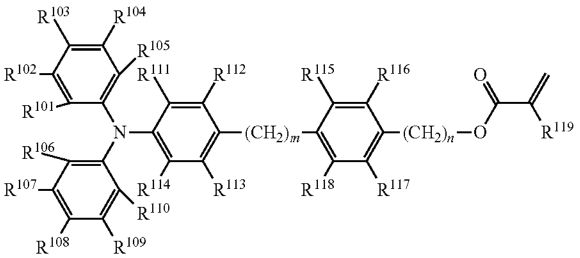

(A2)

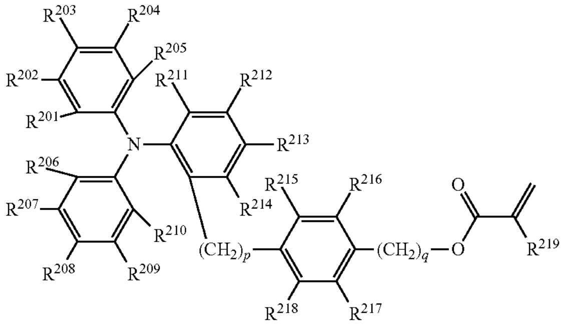

where $R^{101}$ to $R^{119}$ independently represent a hydrogen atom, a methyl group or an ethyl group, “m” and “n” independently represent an integer of 0 to 5, $R^{201}$ to $R^{219}$ independently represent a hydrogen atom, a methyl group or an ethyl group, and “p” and “q” independently represent an integer of 0 to 5.

12. The process cartridge according to claim 1, wherein the content ratio of the diphenylamine compound in the surface layer is 0.1 mass % or less with respect to the total mass of the surface layer.

13. The process cartridge according to claim 1, wherein the surface layer contains a particle A, and particle A comprises a metal atom.

14. The process cartridge according to claim 13, wherein the particle A is a metal oxide particle.

15. The process cartridge according to claim 14, wherein the metal oxide particle is an alumina particle.

16. The process cartridge according to claim 13, wherein a content ratio of particle A in the surface layer is 4 to 16 mass % with respect to a total mass of the surface layer.

17. An electrophotographic apparatus comprising a process cartridge configured to be removably mounted onto a main body of the electrophotographic apparatus, the process cartridge comprising:

an electrophotographic photosensitive member;

a toner; and a developing member configured to supply the toner to the electrophotographic photosensitive member;

the electrophotographic photosensitive member having a surface layer that is a polymerized film of a composition containing (i) at least one kind of monofunctional (meth)acrylic compound selected from the group consisting of a monofunctional (meth)acrylic monomer and a monofunctional (meth)acrylic oligomer, and (ii) at least one kind of tri- or higher functional (meth) acrylic compound selected from the group consisting of a tri- or higher functional (meth)acrylic monomer and a tri- or higher functional (meth)acrylic oligomer;

the surface layer comprising a diphenylamine compound represented by formula (A3)

(A3)

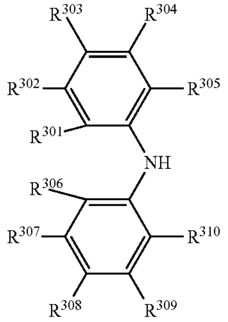

where $R^{301}$ to $R^{310}$ independently represent a hydrogen atom, a methyl group or an ethyl group, wherein a content ratio of the diphenylamine compound in the surface layer is 0.001 to 1.0 mass % with respect to a total mass of the surface layer, the toner contains a toner particle and a hydrotalcite particle as an external additive, and the hydrotalcite particle contains fluorine in filter fitting analysis of STEM-EDS analysis.

* * * * *